United States Patent
Kanichu Veedu et al.

(10) Patent No.: US 11,304,108 B2
(45) Date of Patent: Apr. 12, 2022

(54) EDGE SERVICE CONTINUITY

(71) Applicant: Nokia Technologies Oy, Espoo (FI)

(72) Inventors: Sudhish Kanichu Veedu, Bangalore (IN); Salil Agarwal, Karnataka (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/971,493

(22) PCT Filed: Feb. 20, 2018

(86) PCT No.: PCT/EP2018/054116
§ 371 (c)(1),
(2) Date: Aug. 20, 2020

(87) PCT Pub. No.: WO2019/161882
PCT Pub. Date: Aug. 29, 2019

(65) Prior Publication Data
US 2020/0396665 A1    Dec. 17, 2020

(51) Int. Cl.
*H04W 36/14*    (2009.01)
*H04W 36/00*    (2009.01)
(Continued)

(52) U.S. Cl.
CPC ....... *H04W 36/14* (2013.01); *H04W 36/0066* (2013.01); *H04W 36/06* (2013.01); *H04W 48/18* (2013.01); *H04W 88/06* (2013.01)

(58) Field of Classification Search
CPC . H04W 36/14; H04W 36/0066; H04W 36/06; H04W 48/18; H04W 88/06
See application file for complete search history.

(56) References Cited

U.S. PATENT DOCUMENTS

| | | | |
|---|---|---|---|
| 6,725,039 B1* | 4/2004 | Parmar | H04W 36/0061 455/436 |
| 7,382,750 B2* | 6/2008 | Wu | H04W 36/0066 370/331 |

(Continued)

FOREIGN PATENT DOCUMENTS

| EP | 3209061 A1 | 8/2017 |
|---|---|---|
| JP | 2017-017655 A | 1/2017 |

(Continued)

OTHER PUBLICATIONS

3GPP, "3rd Generation Partnership Project; Technical Specification Group Services and System Aspects; System Architecture for the 5G System; Stage 2, Release 15," 3GPP TS 23.501 V1.4.0, Sep. 2017, 151 pages.

(Continued)

*Primary Examiner* — Julio R Perez
(74) *Attorney, Agent, or Firm* — Tong, Rea, Bentley & Kim, LLC

(57) ABSTRACT

A user equipment (215) obtains authorized service information on edge services for which the user equipment is authorized, obtains edge service information on edge services provided by access elements (210) to provide access to a wireless communication system (200), and selects a first access element of the access elements based on the authorized service information, the edge service information and radio measurements performed by the user equipment. Handover of the user equipment from the first access element to a second access element is decided based on edge service information on edge services which are provided by the second access element, authorized service information on authorized edge services for the user equipment, and radio measurements provided by the user equipment.

15 Claims, 13 Drawing Sheets

(51) Int. Cl.
*H04W 36/06* (2009.01)
*H04W 48/18* (2009.01)
*H04W 88/06* (2009.01)

(56) References Cited

U.S. PATENT DOCUMENTS

| | | | |
|---|---|---|---|
| 7,983,229 B2 * | 7/2011 | Bachmann | H04L 63/0272 370/338 |
| 8,600,375 B2 * | 12/2013 | Roger | H04W 60/04 455/432.1 |
| 8,948,125 B2 * | 2/2015 | Hallenstal | H04W 36/0022 370/331 |
| 9,225,449 B2 * | 12/2015 | Heo | H04W 36/0055 |
| 10,849,097 B2 * | 11/2020 | Du | H04W 68/02 |
| 11,026,140 B2 * | 6/2021 | Kim | H04W 36/14 |
| 2016/0014620 A1 | 1/2016 | Narayanan et al. | |
| 2018/0132141 A1 * | 5/2018 | Huang-Fu | H04L 65/1016 |
| 2019/0394669 A1 * | 12/2019 | Han | H04W 76/12 |
| 2020/0187025 A1 * | 6/2020 | Agarwal | H04W 64/006 |

FOREIGN PATENT DOCUMENTS

| | | | | |
|---|---|---|---|---|
| WO | WO 2018/031070 A1 | 2/2018 | | |
| WO | WO-2018131904 A1 * | 7/2018 | | H04W 36/14 |
| WO | WO 2019/057268 A1 | 3/2019 | | |

OTHER PUBLICATIONS

ETSI, "Mobile Edge Computing (MEC); Mobile Edge Management; Part 2: Application lifecycle, rules and requirements management," ETSI GS MEC 010-2 V1.1.1, Jul. 2017, 48 pages.

\* cited by examiner

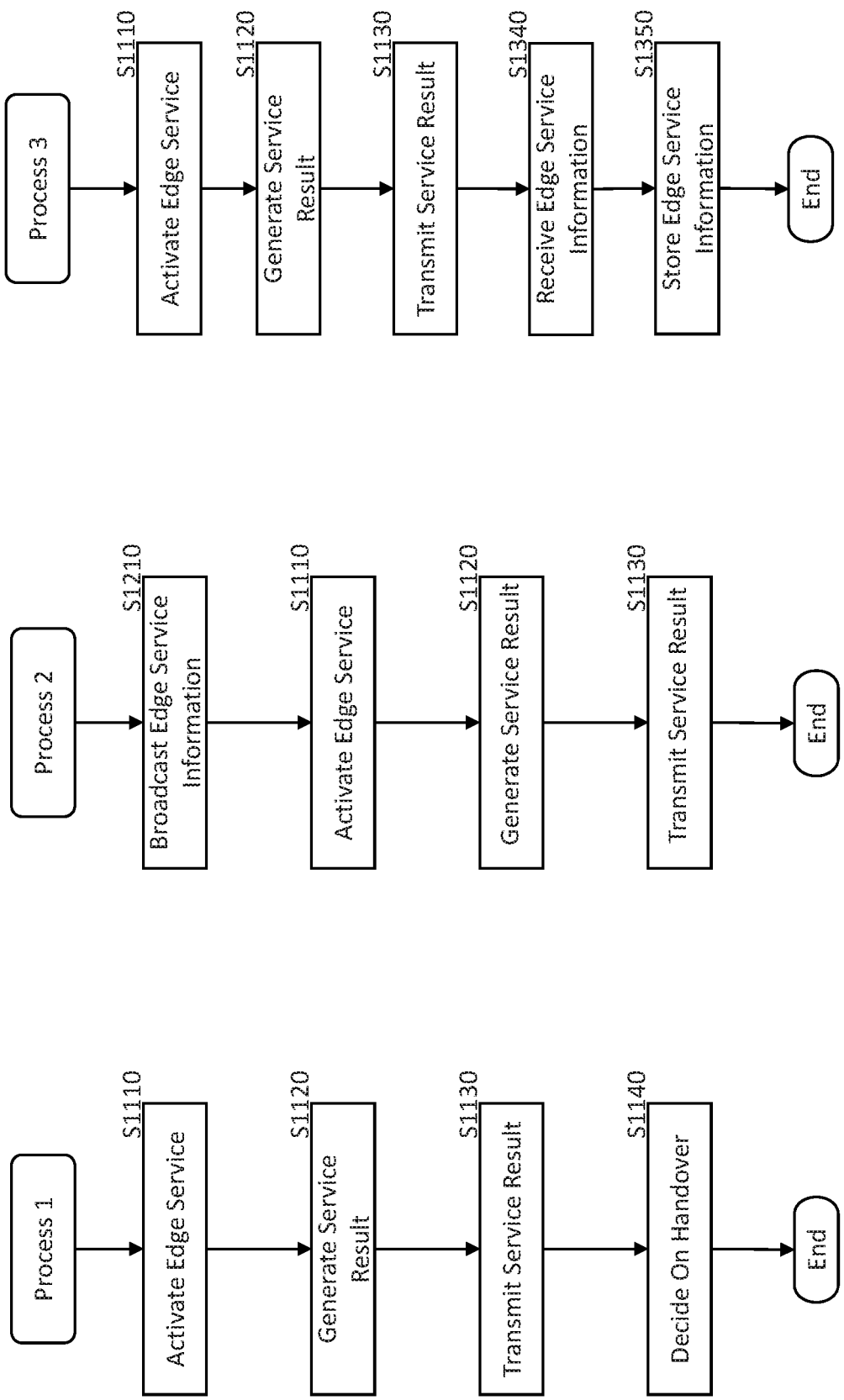

EDGE SERVICE CONTINUITY

CROSS-REFERENCE TO RELATED APPLICATIONS

The present application is a 371 application of PCT Patent Application Serial No. PCT/EP2018/054116, entitled "Edge Service Continuity", and filed on Feb. 20, 2018, the entirety of which is incorporated by reference herein.

TECHNICAL FIELD

The present invention relates to mobile-edge computing and multi-access edge computing, and in particular to edge service continuity regarding e.g. cell selection and handover.

BACKGROUND

Wireless communication systems implement mobile-edge computing (MEC) to provide computing capabilities in relatively close proximity to user equipment (UE). The MEC architecture typically includes an access element (which can also be referred to as an access node) and an edge network that supports a MEC platform that provides a hosting infrastructure and an application platform. The edge network supports an interface to a core network, which supports interfaces to a subscriber database and a packet data network gateway (PGW) to an external network such as the Internet.

In MEC, deploying value added applications at the edge of a network (like LTE (long term evolution), WiFi (wireless fidelity), 5G (fifth generation), etc.) is enabled. Applications deployed at the edge of the network may leverage on low latency, proximity, high bandwidth, and information related to radio and location of the user equipment.

Apart from acquiring user data flow at the edge, such applications leverage additional information from radio network like cell load and congestion, UE radio measurements and handover events. This information is provided by a radio network information service (RNIS) at the edge of the network or an equivalent service in case of 5G. Examples of the information provided by the RNIS include indications of activation of the UE, parameters of the UE context, and parameters of a radio access bearer established for the UE such as a Quality-of-Service (QoS) class identifier (QCI), cell identifiers for the UE, an identifier of a logical connection to the UE (e.g., a tunnel identifier), and the like. Applications implemented in the edge network can use the information provided by the RNIS, e.g. in combination with the information acquired by monitoring user plane traffic, to provide services.

Some of the services offered by MEC may require knowledge of real-time layer 2 parameters and radio insights (e.g. layer 1 parameters). Visibility into these layer 2 parameters and radio insights, e.g. layer 1 parameters, is better realized if the needed functionality is implemented inside the radio access node directly. These services are controlled by an edge service agent at MEC. Such edge services offer means to provide enriched quality of experience to end customers. Throughput guidance is an example of such an edge service that improves video quality of experience.

However, there are cases where not all radio access nodes implement these services. In such cases, it may be possible that a user equipment (user device) connects to a cell that does not provide such services or a user device may get handed over to a cell not providing such services. This scenario prevents a genuine subscriber from using these services that may be available otherwise in another accessible radio access node. In case of mobile Internet of things (IoT) subscribers that use these services in critical communications (like V2X (vehicle to infrastructure (X)) communication), being unable to connect to a cell that offers edge services can result in unavailability of such services for the device that may severely impact the latency, throughput quality of communication and quality of experience, and possibly lead to adverse consequences.

SUMMARY

Some embodiments of the invention aim at overcoming the above problem.

According to some embodiments of the invention, methods, apparatuses and computer-readable storage media (e.g. non-transitory storage media) are provided as defined in the appended claims.

According to some embodiments of the invention, edge service criterion is used at the time of initial cell selection or handover rather than after inspecting active traffic relevant for an edge service requiring knowledge of real-time layer 1 and layer 2 parameters. This way, whenever a UE needs to utilize such service, it is readily available instead of incurring control plane signaling latency at the time of initial cell selection or handover to move the UE to a cell providing the service.

In the following the invention will be described by way of embodiments thereof with reference to the accompanying drawings. The use of the same reference signs in different drawings indicates similar or identical items.

BRIEF DESCRIPTION OF THE DRAWINGS

FIG. 11 shows a flow chart illustrating a process executable by an access element according to some embodiments of the invention.

FIG. 12 shows a flow chart illustrating a process to be executed by an access element according to some embodiments of the invention.

FIG. 13 shows a flow chart illustrating a process executable by an access element according to some embodiments of the invention.

DESCRIPTION OF THE EMBODIMENTS

Services such as MEC services are given access to layer 1 and layer 2 parameters by implementing an edge service in an access element and registering the edge service in a registry that is accessible to an edge service agent implemented in an edge network or a centralized location such as a core network. Registering the edge service includes registering the edge service as an endpoint indicated by one or more of an Internet Protocol (IP) address, a port, a protocol, or a universal resource locator (URL). Registering the edge service also includes registering discovery criteria for the edge service such as a cell identifier. The edge service is therefore discoverable by the edge service agent, e.g., using the cell identifier associated with the user equipment receiving the service. The edge service agent determines whether a user, a bearer, or an IP flow qualifies for the service. Some embodiments of the edge service agent make this determination based on an international mobile subscriber identity (IMSI) retrieved from a User Identity Service (UIS) or other shared data repository, an identifier of a radio access bearer retrieved from a radio network information service (RNIS), an IP address of the endpoint of the IP flow, or an identifier that represents a complete IP 5-tuple. In response to determining that the user, bearer, or IP flow qualifies for the service, the edge service agent instructs the access element to activate the edge service by providing information indicative of the user, bearer, or flow to the access element. The edge service agent can configure parameters for providing the edge service, such as parameters indicating whether the service reports results "in-band" as part of the uplink or downlink traffic flow or "out-of-band" to the edge service agent. The edge service agent forwards the "out-of-band" information using a separate connection to an application that is utilizing the edge service. The edge service agent can also configure a reporting frequency for the edge service.

Figure 1:
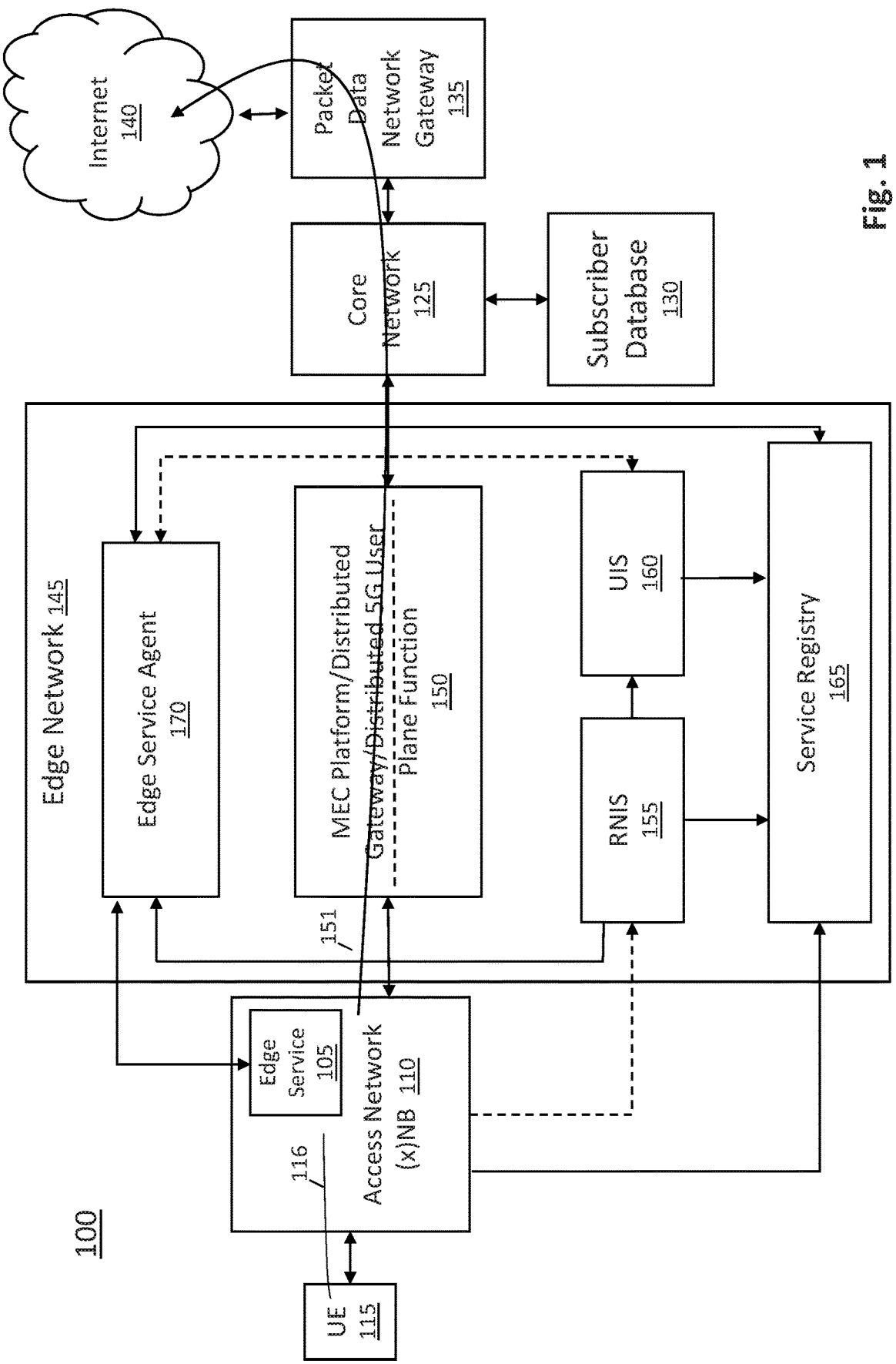
FIG. 1 shows a schematic block diagram illustrating a wireless communication system that implements an edge service at an access element.

FIG. 1 is a block diagram of a wireless communication system 100 that implements an edge service 105 at an access network (x)NB (which is also referred to as access element) 110. The wireless communication system 100 provides wireless connectivity to one or more user equipment 115 within a geographical area or cell that is served by the access element 110 via one or more antennas (not shown), which can be disposed proximate to or at a distance from the access element 110, e.g., as one or more remote radio heads. Reference sign 116 indicates uplink traffic from the user equipment 115. The wireless communication system 100 also includes a core network 125, a subscriber database 130, and a packet data network gateway (PGW) 135 that provides a gateway to an external network 140 such as the Internet. The access element 110 communicates with the core network 125 via an edge network 145. The access element 110 can be referred to an eNodeB, a gNB, or using other terms depending on the radio access technology that is implemented by the access element 110.

The edge network 145 implements an MEC platform 150 that is disposed in line between the access element 110 and the core network 125 and therefore conveys uplink and downlink traffic between the access element 110 and the core network 125. The edge network 145 also implements an RNIS 155 that stores and provides radio network information. Some embodiments of the edge network 145 implement a user identity service (UIS) 160 that can provide a secure user identity to the RNIS 155. The UIS 160 stores an actual user identity such as an international mobile subscriber identity (IMSI) of the user equipment 115 but does not provide this identity to applications. Instead, the UIS 160 provides a secure user identity that is uniquely mapped to the IMSI of the user equipment 115.

Implementing the edge service 105 in the access element 110 allows the edge service 105 to access layer 1 and layer 2 parameters in real time, which allows the edge service 105 to improve the accuracy and usefulness of service results generated by the edge service 105. The edge service 105 can use the real-time layer 1/layer 2 parameters to generate service results for a user (e.g., the user equipment 115), a radio access bearer that is terminated by the user equipment 115, or a flow that is supported by the radio access bearer. The service results can then be provided to applications such as applications providing video content to the user equipment 115.

The edge service 105 is registered with a service registry 165 that can be implemented in the edge network 145. The service registry 165 can also be implemented in other locations that are accessible to the entities implemented in the edge network 145. Some embodiments of the edge service 105 register with the service registry 165 by providing information identifying an endpoint of the service, such as an IP address, a port number, a protocol, or a universal resource locator (URL), as well as a discovery criteria such as a cell identifier. The service registry 165 stores this information so that the edge service 105 becomes discoverable by an edge service agent 170 that is implemented in the edge network 145. The edge service agent 170 is then able to set service-specific configuration parameters to configure the edge service 105 to execute service-specific computations and generate service results. For example, computing throughput guidance requires that the edge service 105 be configured with bearer identities or identifiers of traffic flows that utilize the throughput guidance. The edge service 105 performs a computational algorithm and other tasks (e.g., inserting or enriching packets in a traffic load to include the service results in the packets for in-band reporting). The edge service 105 can consider throughput at the radio access bearer, IP flow, or cell level, as well as dynamic radio parameters available at the access elements 110 such as HARQ retransmission parameters, PRB allocations, and buffer occupancies.

The edge service 105 interacts with the edge service agent 170 to access information indicating the radio access bearer or IP flow that uses results generated by the edge service 105. Some embodiments of the edge service 105 can also access other service-specific parameters such as a reporting criteria for reporting the service results, a reporting frequency, and the like from the edge service agent 170. In the event that the user equipment 115 gets handed off from the access element 110 to a target access element (not shown in FIG. 1), the edge service 105 interacts with the target access element by exchanging service specific parameters as part of a handover preparation procedure. In some embodiments, the service-specific parameters are exchanged in a "transparent container". A target edge service can then be established in the target access element using the service-specific parameters to provide service continuity to the user, radio access bearer, or flow during and after the handover.

The edge service agent 170 is responsible for controlling the overall services provided at the edge of the network, including the edge service 105. In some embodiments, more than one edge service agent is implemented in the edge network 145 to support different edge services. For example, if the access element 110 supports multiple edge services, the edge network 145 can implement a single edge service 170 to support all of the edge services supported by the access element 110 or the edge network 145 can implement a separate edge service agent for each edge service supported by the access element 110. The edge service agent 170 is also able to control other edge services that may be implemented in the access element 110 or other access elements that are connected to the edge network 145. The edge service agent 170 is configured to determine whether a user, radio access bearer, or IP flow is qualified to receive the edge service 105. For example, the edge service agent 170 can perform qualification of a user based on an IMSI provided by the UIS 160, a radio access bearer based upon a SPID provided by the RNIS 155, or an IP flow based upon an IP address of the endpoint at the user equipment 115. The edge service agent 170 also generates service-specific parameters that are provided to configure the edge service 105 and reporting criteria for the edge service 105 such as reporting time intervals or events that trigger reporting of the service results.

Publishing of the service results to other entities (such as application servers connected to the external network 140) is performed by the edge service agent 170. Some embodiments of the edge service agent 170 are also configured to authorize or authenticate the entities that receive the service results. The edge service agent 170 can receive information defining the reporting frequency of service results from an application that is utilizing the edge service 105. The edge service agent 170 can also receive information indicating whether the edge service 105 is to report the service results "in-band" by encoding the results in headers of uplink data packets (which are referred to as enriched packets) transmitted to the edge network 145 or "out-of-band" using other messages (e.g., packets that are not part of the uplink data flow and are not transmitted along the connection used to convey packets in the uplink data flow) that are transmitted using a different connection. Information that is used to configure or implement out-of-band signaling can be exposed to over-the-top (OTT) applications that are outside a domain of an operator of the wireless communication system 100. Reference sign 151 shown in FIG. 1 indicates uplink traffic towards a server, enriched by edge service.

The edge service agent 170 is able to discover the edge service 105 using information in the service registry 165. In some embodiments, the edge service agent 170 discovers the edge service 105 in response to establishment of a radio access bearer terminated by the user equipment 115, in response to establishment of a new flow supported by the radio access bearer, or in response to other triggers. Discovery is performed on the basis of service-specific discovery criteria that are stored in the service registry 165 during registration of the edge service 105.

In the architecture shown in FIG. 1, an edge service is provided only if the radio access node/cell to which the user equipment/device is attached offers such a service. In case the selected cell does not support the service required by the device, the service simply is not provided to the device, which this leads to lower customer satisfaction. This problem is even more severe if the only purpose that the device (e.g. a camera, VR (virtual reality)/AR (augmented reality) device) connects to the network is for services such as video upload/download, for which suitable edge services are needed for optimized video delivery.

Further, in case of a handover when a target cell is chosen based on radio measurements only, it may be possible that the chosen target cell does not support the edge service. In such a scenario, it is possible that edge services may get discontinued. This may lead to a reduction in perceived quality of experience, and in case the device is a moving thing (e.g. a vehicle) such disruption can lead to adverse consequences.

According to some embodiments, edge services availability at a per cell level is advertised to a user equipment/device.

According to some embodiments, a UE/device discovers advertised edge services.

According to some embodiments, a UE/device knows about the edge services that are authorized for its usage. The UE/device may be informed about changes in its authorization/subscription of edge services.

According to some embodiments, a UE/device that is authorized to use a set of edge services from a radio access node selects a cell which offers best combination of such services while also satisfying a radio condition criterion.

According to some embodiments, a device/UE selects a cell that supports edge services, based on the advertised edge services.

According to some embodiments, adjacent radio access nodes exchange and learn information about each other's capabilities regarding support for edge services offered by them.

According to some embodiments, handover decisions consider the availability of edge services in candidate cells in addition to other existing factors like radio measurements for selecting a target cell for handover.

According to some embodiments, handover decisions consider the edge services authorized for a UE/device in addition to other existing factors like radio measurements for selecting a target cell for handover.

Figure 2:
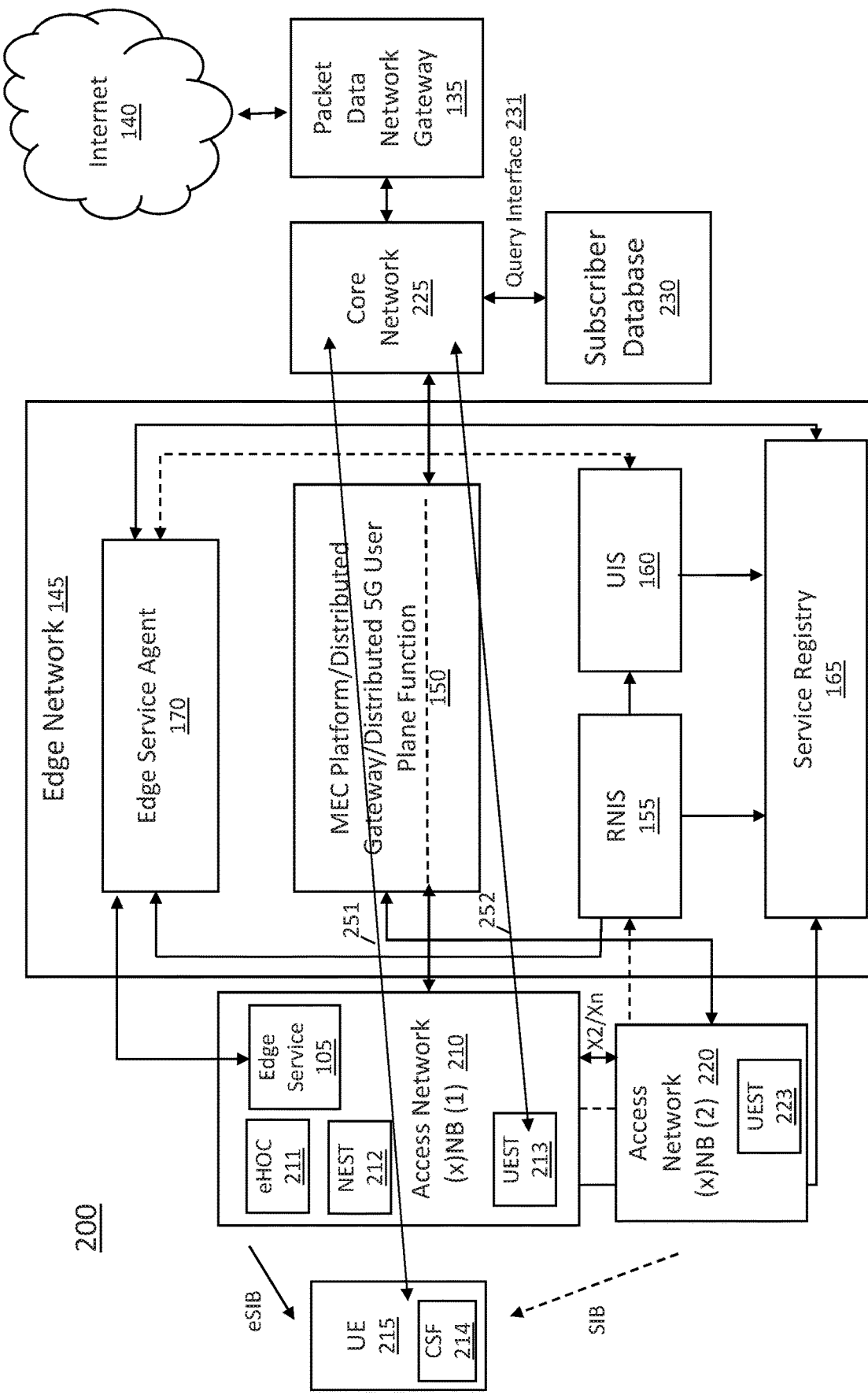
FIG. 2 shows a schematic block diagram illustrating a first example implementation of a wireless communication system according to some embodiments.

FIG. 2 shows a schematic block diagram illustrating a first example implementation of a wireless communication system 200 according to some embodiments.

In the wireless communication system 200, structure and functionality of edge service 105, elements 150, 155, 160, 165 and 170 of edge network 145, packet data network gateway 135 and the Internet 140 are similar to structure and functionality of the corresponding elements described with respect to the wireless communication system 100 shown in FIG. 1.

The wireless communication system 200 shown in FIG. 2 comprises a radio access node (which is also referred to as access element) 210, e.g. an e/gNodeB, that is responsible for hosting and providing edge services (comprising the edge service 105) that require layer 2 and/or layer 1 (e.g.

radio insights) as described with respect to access node 110 of FIG. 1. According to some embodiments, access element 210 comprises the functionality of access node 110.

Referring to FIG. 12, according to some embodiments, in step S1210, the access element 210 broadcasts edge service information about one or more edge services provided by the access element 210, in addition to steps S1110, S1120 and S1130 shown in FIG. 11 of activating one or more edge services in response to receiving information identifying at least one of a user, a radio access bearer and a flow that is to be served by the one or more edge services (S1110), generating, at the one or more edge services, a service result based on at least one of a layer 1 parameter and a layer 2 parameter available at the access element 210 (S11209, and transmitting the service result to the edge service agent 170 implemented externally to the access element 210 (S1130), as described with respect to FIG. 1 above. For example, the edge service information comprises information on the edge service 105 supported by the access element 210. For example, the edge service information is broadcast for each cell served by the access element 210.

According to some embodiments, the edge service information is broadcast in a new SIB (system information broadcast), or is broadcast in an enhancement to an existing SIB. In FIG. 2, broadcasting the edge service information is indicated by eSIB (enhanced SIB). eSIB can be implemented as a new mandatory SIB or by extending another mandatory SIB like SIB2.

According to some embodiments, the edge service information is broadcast in a data format which comprises at least one of a cell identifier, a list of edge services identified by their respective edge service identifiers, and an offset value to relax cell selection power level criteria. For example, this offset is considered from the strongest received power value among cells available for cell selection. For example, if the strongest cell's received power level is −40 dBm and the offset is −10 dBm, then cells with received power level of up to −50 dBm are to be considered as candidates for selection provided they are offering required edge services.

According to some embodiments, the access element 210 exchanges with each neighbor over X2 interface using X2 Setup messages the edge services that are supported by the access element 210. These edge services themselves are identified by their respective edge service ids per cell. This information is stored in a neighbor edge services table/database (NEST) 212. In case of update to such edge services like addition/removal, the updated information is exchanged with neighbor nodes using eNodeB Configuration update messages. In case of 5G networks, equivalent messages are be used.

According to some embodiments, the access element 210 obtains authorized service information on authorized edge services for a UE. For example, the access element 210 receives the authorized service information as part of Initial Context Setup for the UE e.g. via communication path 252 indicated in FIG. 2 from the core network 225 (e.g. an element of the core network 225). The authorized service information is stored in an internal database referred to as UE/device edge services table/database (UEST) 213. The authorized service information is stored for an identity of the UE known to the access element 210. For example, the identity is S-TMSI (SAE (system architecture evolution)-temporary mobile subscriber identity) or any other identity known to the access element 210 for managing UE context stored at the access element 210. The authorized services are used to make decisions for handover according to enhanced handover control (eHOC) 211 of the access element 210, and are removed whenever the UE context is released. This information about authorized services is sent over to a target radio access node as part of handover preparation message which will be described later referring to FIG. 6.

Access element 220 shown in FIG. 2 may provide access to the edge network 145 and comprise a UE/device edge services table/database (UEST) 223 for storing authorized service information of a user equipment but does not comprise functionality of edge service, NEST and eHOC, and does not broadcast edge service information in SIB.

According to some embodiments, while deciding over handover to a target cell for a UE, the enhanced handover control (eHOC) 211 of the access element 210 also takes into consideration a list of edge services the UE is authorized for using UEST 213. This is done by considering availability of these edge services at candidate target cells using NEST 212. According to some embodiments, eHOC 211 maintains a threshold up to which a candidate cell with best fitting edge services is chosen over a cell which is otherwise considered best for handover when using radio conditions as the only criteria.

In other words, referring to FIG. 11 illustrating a process 1, according to some embodiments, in addition to activating one or more edge services in response to receiving information identifying at least one of a user, a radio access bearer and a flow that is to be served by the one or more edge services in step S1110, generating in step S1120, at the one or more edge services, a service result based on at least one of a layer 1 parameter and a layer 2 parameter available at the access element 210, and, in step S1130, transmitting the service result to the edge service agent 170 implemented externally to the access element 210 as described by referring to FIG. 1, in step S1140 the access element 210 decides on a handover of a user equipment from the access element (first access element) 210 to a second access element of second access elements, based on second edge service information on edge services which are provided by the second access elements, authorized service information on authorized edge services for the user equipment, and radio measurements provided by the user equipment.

According to some embodiments, the wireless communication system 200 shown in FIG. 2 comprises a user equipment (UE)/device 215. According to some embodiments, the UE/device 215 is enhanced to learn about its subscription of edge services at the time of performing a first attach procedure e.g. by enhancement to attach procedure. The UE/device 215 comprises a cell (re-)selection function (CSF) 214 that is enhanced to listen to new eSIB broadcasting about the availability of edge services in the cell and compare with the subscribed/authorized edge services for the UE/device 215. Based on this comparison and the received power level from the cell, a cell (re-) selection is made to the cell best offering the required edge services and radio conditions. According to some alternative embodiments, authorized edge services are made available in SIM (subscriber information module) of the device/UE 215, e.g. are provisioned directly in the SIM.

Figure 14:
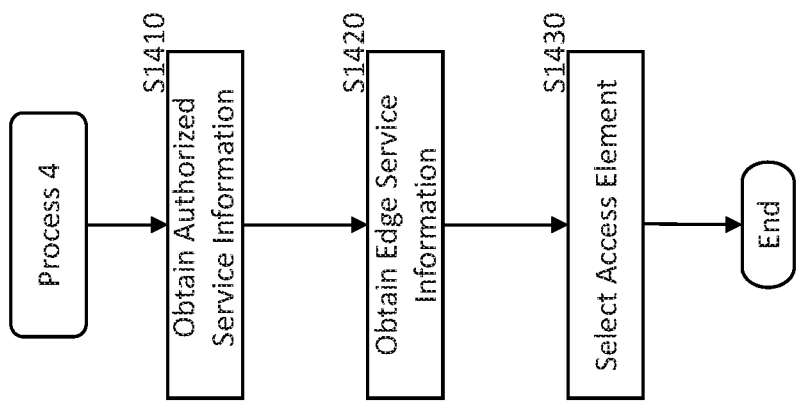
FIG. 14 shows a flow chart illustrating a process executable by a user equipment/device according to some embodiments of the invention.

In other words, referring to FIG. 14 illustrating a process 4, according to some embodiments, in step S1410, the UE/device 215 obtains authorized service information on one or more edge services for which the user equipment is authorized, e.g. from an element of the core network 225 of the wireless communication system 200 e.g. via communication path 251 indicated in FIG. 2, and/or from the SIM, obtains, in step S1420, edge service information on edge services provided by access elements to provide access to the wireless communication system 200 from access elements (including the access element 210) via broadcast messages (e.g. eSIB).

According to some embodiments, which will be described later, in step S1430, the UE/device 215 selects an access element of the access elements based on the authorized service information, the edge service information and radio measurements performed by the UE/device 215.

According to some embodiments, the wireless communication system 200 shown in FIG. 2 comprises the core network 225 that is responsible for handling service management procedures like the attach procedure. According to some embodiments, the core network 225 gets information about subscribed/authorized edge services for the UE/device 215 from a subscriber database 230 of the wireless communication system 200 during attach procedure, e.g. via query interface 231, and provides a list of these services in a response message e.g. via communication path 251. Additionally, the core network 225 may use downlink NAS transport to inform the UE/device 215 of any changes in its subscription/authorization for edge services. According to some embodiments, a new message at NAS level transported inside downlink NAS transport over S1-C interface is provided in case the wireless communication system 200 comprises an LTE network.

Figure 15:
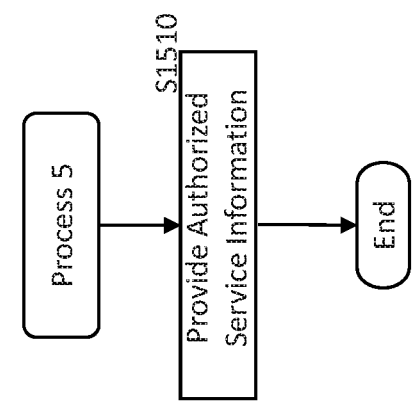
FIG. 15 shows a flow chart illustrating a process executable by an element of a core network or an edge services control server according to some embodiments of the invention.

In other words, referring to FIG. 15 illustrating a process 5, according to some embodiments, in step S1510, the core network 225 (e.g. an element of the core network 225) provides authorized service information on one or more edge services for which the UE/device 215 is authorized to the UE/device 215 e.g. during an attach procedure and/or using downlink non-access stratum transport.

Further, according to some embodiment, the core network 225 provides the authorized service information to the access element 210 via communication path 252 during an initial context setup.

According to some embodiments, the wireless communication system 200 shown in FIG. 2 comprises the subscriber database 230 which stores the edge services which are authorized for the subscriber (e.g. the UE/device 215). The subscriber database 230 exposes the interface 231 for core network 225 to query this information using e.g. either HTTPS based RESTful interface (in case of SDL based database) or Diameter based (in case of HSS based database) interface. The subscriber database 230 may also expose an interface to core network 225 (MME (mobility management entity) in case of LTE network) to indicate change in subscription of the UE/device 215. In addition, the subscriber database 230 may keep a mapping of edge service id to edge service name for an operator network.

According to some embodiments, following information is kept at the subscriber database 230:

Edge service mapping: Mapping of edge service Id [1, 2, 3 . . . ] to edge service name [TG, . . . ]; and Subscriber's edge service authorization: Information for each subscriber identified by its IMSI to edge services, identified by edge service ids the subscriber is entitled to use.

Figure 17:
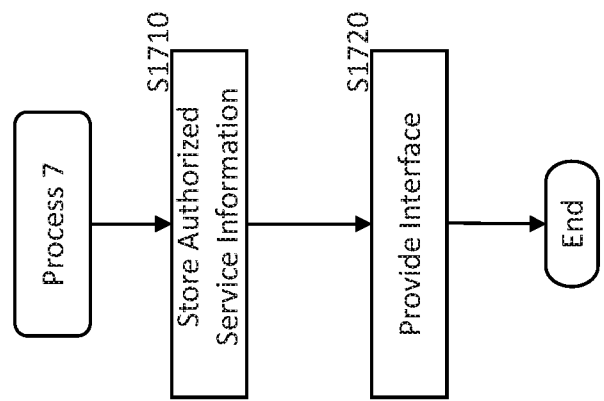
FIG. 17 shows a flow chart illustrating a process executable by a subscriber database according to some embodiments of the invention.

In other words, referring to FIG. 17 illustrating a process 7, according to some embodiments, in step S1710, the subscriber database 230 stores authorized service information on authorized edge services of the UE/device 215, and, in step S1720, provides an interface (e.g. query interface 231) to the core network 225 to query the authorized service information and/or to indicate changes of the authorized service information. The subscriber database 230 may provide mapping between edge service identifiers and edge service names.

Alternatively, according to some embodiments, the edge service mapping of id and name is held at another entity like MME or some other server like DNS and not necessarily in the subscriber database 230.

In the following, scenario examples of the first example implementation illustrated in FIG. 2 will be described referring to FIGS. 3 to 6, which are based on LTE elements and flows as an example implementation, however the same can be applied to any other technology like 5G etc.

Figure 3:
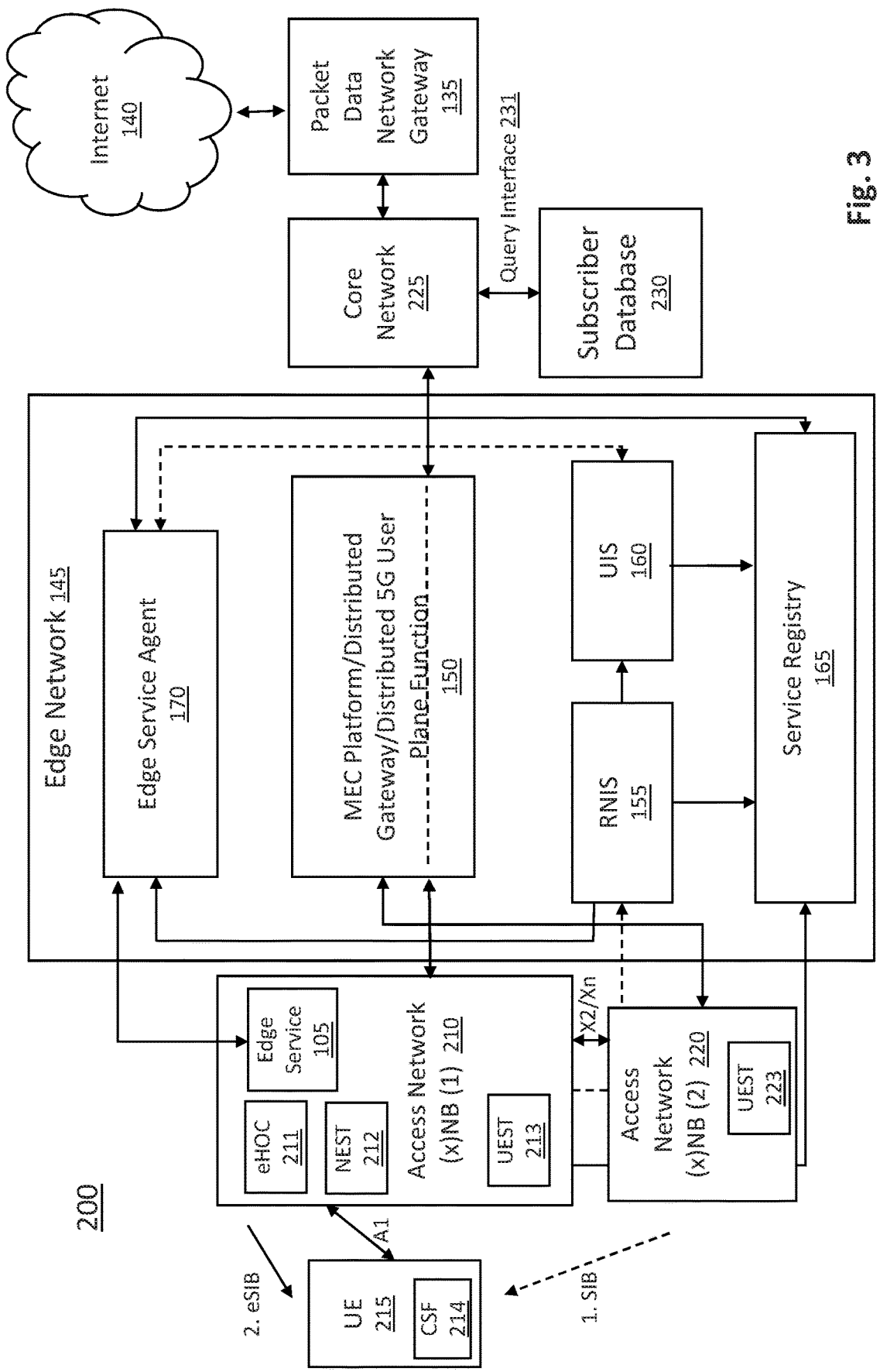
FIG. 3 illustrates cell selection according to some embodiments using the first example implementation.

FIG. 3 illustrates a scenario 1 according to some embodiments, in which the UE/device 215 is in idle state and performs cell selection based on edge services it is authorized to use.

If the UE/device 215 has the list of authorized/subscribed edge services stored in the u/eSIM, then it can execute a direct cell selection based on edge services required. If the UE/device does not have this information it needs to re-initiate a cell selection after getting details of edge services authorized for it (which will be described with respect to scenario 2 shown in FIG. 4).

Following steps are executed by the UE/device 215 when the UE/device 215 already has the information about its subscribed/authorized edge services. In a first step, the UE/device 215 makes a list of candidate cells which are offering radio conditions within the threshold passed in eSIB. In a second step, the UE/device 215 re-initiates the procedure for best cell selection according to edge services supported at cell (advertised in eSIB) and subscribed/authorized edge services and by taking into account radio thresholds/offset given in eSIB, as indicated by A1 in FIG. 3.

Figure 4:
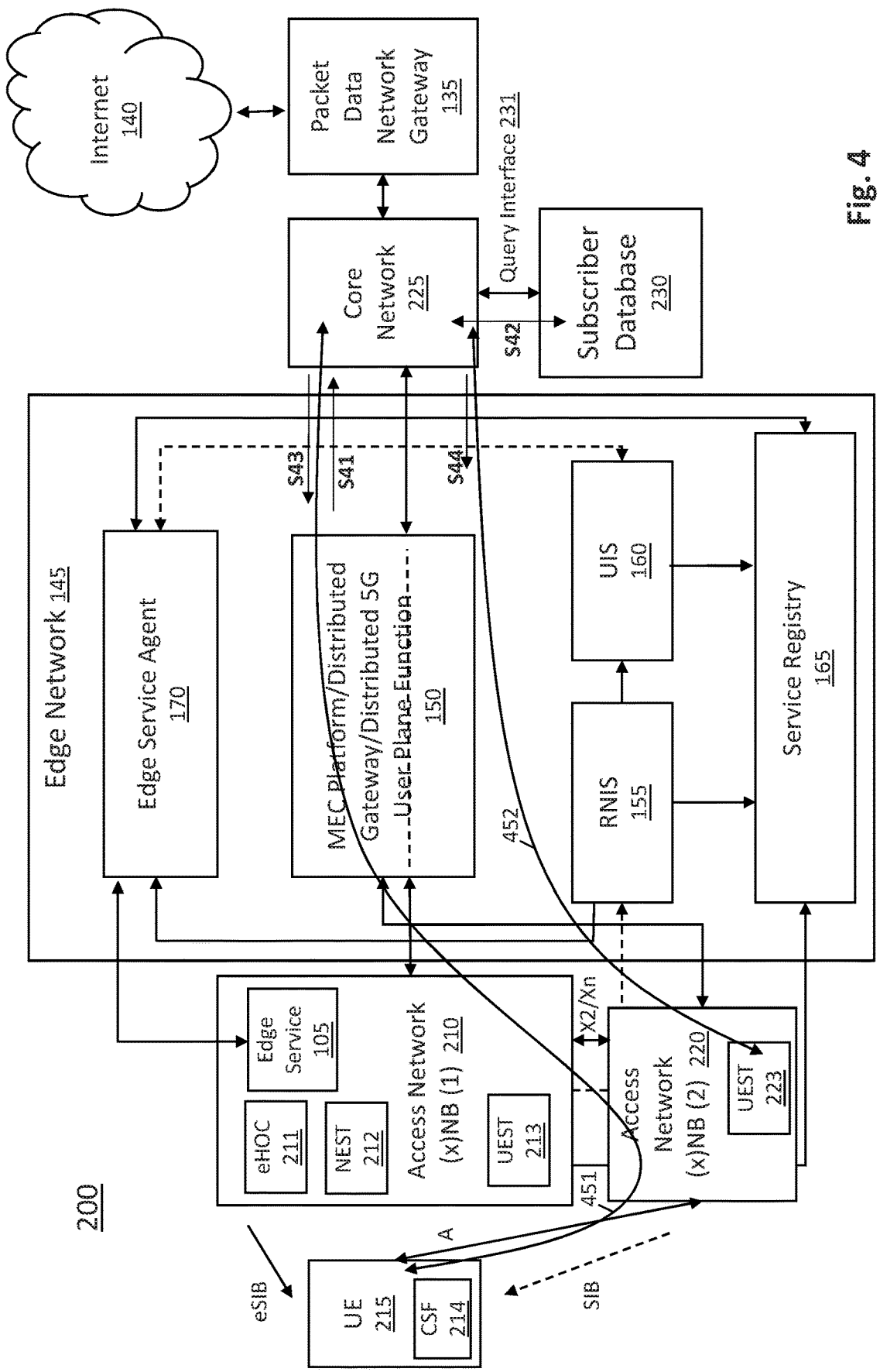
FIG. 4 illustrates attach and initial context setup procedures according to some embodiments using the first example implementation.

Now reference is made to FIG. 4 illustrating a scenario 2 according to some embodiments, in which the UE/device 215 learns of edge service(s) it is authorized to use. FIG. 4 shows a cell selection and enhanced attach procedure.

In step A shown in FIG. 4, the CSF 214 has chosen e/gNB (2) 220 based on measurements. This cell in the scenario is not supporting any edge service. Following are the steps that are executed as part of this scenario.

In step S41, when the UE/device 215 is switched on for the first time, it performs cell selection based on existing 3GPP procedure and sends an attach request to core network 225 via communication path 451.

In step S42, MME (in case of LTE) at core network 225 queries the subscriber database 230 like HSS or shared data layer based database (using either HTTPS or Diameter protocol, for example) e.g. via query interface 231, for acquiring edge services capabilities allowed for the UE/device 215 being attached.

In step S43, the core network 230 delivers the list of edge service(s) allowed for the UE/device 215 with at least one of the following information in attach accept via communication path 451:

Service ID (e.g. 1, 2, 3 . . . ); and

Service name (e.g. throughput guidance).

Upon receiving attach response via communication path 451, the UE/device 215 stores the information provided in the above step in its database like u/eSIM.

According to some embodiments, in an alternative to attach procedure the information about subscribed/authorized edge services is already made available in u/eSIM before first usage of the UE/device 215.

In step S44, initial context setup message from core network (MME) 225 to access element 220 via communication path 452 is enhanced to carry the list of authorized services for the UE/device 215. Upon receiving this message, the access element 220 store this information in its internal database UEST 223.

In case of change of edge services subscription/authorization at subscriber database 230, the subscriber database 230 indicates this to core network 225 which in-turn can create a new NAS message and pass it using downlink NAS transport message over S1-C interface to indicate the UE/device 215 e.g. via communication path 451 about the change. In case the UE/device 215 is in idle state, the core network 225 can perform a paging procedure followed by downlink NAS transport. Upon receiving the new NAS message, the UE/device 215 updates the information stored in its u/eSIM.

Figure 5:
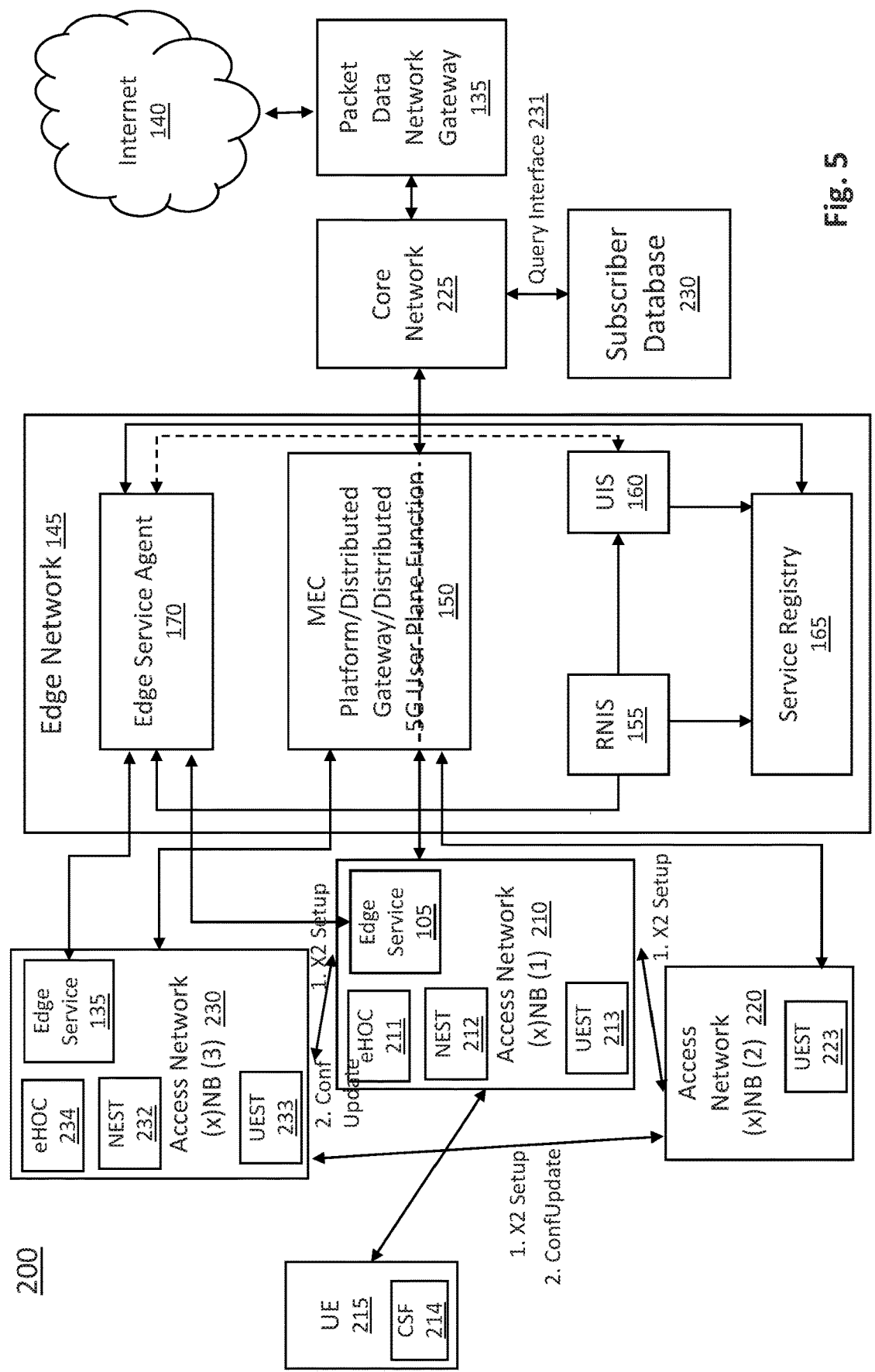
FIG. 5 illustrates message exchanges between neighboring radio access nodes according to some embodiments using the first example implementation.

Now reference is made to FIG. 5 illustrating a scenario 3 according to some embodiments, in which radio access nodes (access elements) 210, 220, 230 exchange information about available edge services with neighbors.

In FIG. 5, the wireless communication system 200 comprises a radio access node (which is also referred to as access element) 230, e.g. an e/gNodeB, that is responsible for hosting and providing edge services (comprising the edge service 135) that require layer 2 and/or layer 1 (e.g. radio insights) as described with respect to access node 110 of FIG. 1. The access element 230 comprises databases NEST 232 and UEST 233 and a functionality of eHOC 234.

Following steps are performed by the radio access nodes 210, 220, 230.

In a first step, each radio access node sends a setup message (e.g. X2/Xn setup request message) whenever a new neighbor is identified and connected, as indicated by "1. X2 Setup" in FIG. 5. In case of access elements 210 and 230, this message is enhanced to carry a list of edge services information supported on a per cell basis, to the neighbor. Information for each edge service may contain at least one of the following:

Edge service ID;

Edge service name;

List of cell identities (ECGI) contained in the radio access node 210, 230 sending X2/Xn setup request where the service is supported; and Parameters related to service.

Upon receiving X2/Xn setup request, the neighboring node 210, 230 updates its database for edge services in its neighbor edge services table/database (NEST) 212, 232. The receiving access node prepares its X2/Xn setup response with the above-mentioned information of its own cells and sends it to the access node which originally sent the X2 setup request.

In a second step, when receiving the X2/Xn setup response message from the neighbor, the access element 210, 230 updates the information about supported edge services of neighboring cells in its neighbor edge services table/database (NEST) 212, 232.

In a third step, whenever a new edge service is added, removed or modified at the access element 210, 230, it sends a configuration update message to all neighbor access elements 230, 210 with which X2/Xn logical connection is already established. This message can be ENB configuration update in case of LTE, illustrated by "2. ConfUpdate" in FIG. 5.

In a fourth step, the receiving access element 210, 230 updates its own configuration about neighboring cells supporting edge services as per the configuration update message in NEST 212, 232.

In other words, referring to FIG. 13 illustrating a process 3, in addition to activating one or more edge services in response to receiving information identifying at least one of a user, a radio access bearer and a flow that is to be served by the one or more edge services in step S1110 shown in FIG. 11, generating in step S1120, at the one or more edge services, a service result based on at least one of a layer 1 parameter and a layer 2 parameter available at the access element 210, and, in step S1130, transmitting the service result to the edge service agent 170 implemented externally to the access element 210 as described by referring to FIG. 1, in step S1340, access element 210 (230) receives, from access element 230 (210) edge service information on edge services which are provided by access element 230 (210), and, in step S1350, stores this edge service information in neighbor edge services database (NEST) 212 (232).

Figure 6:
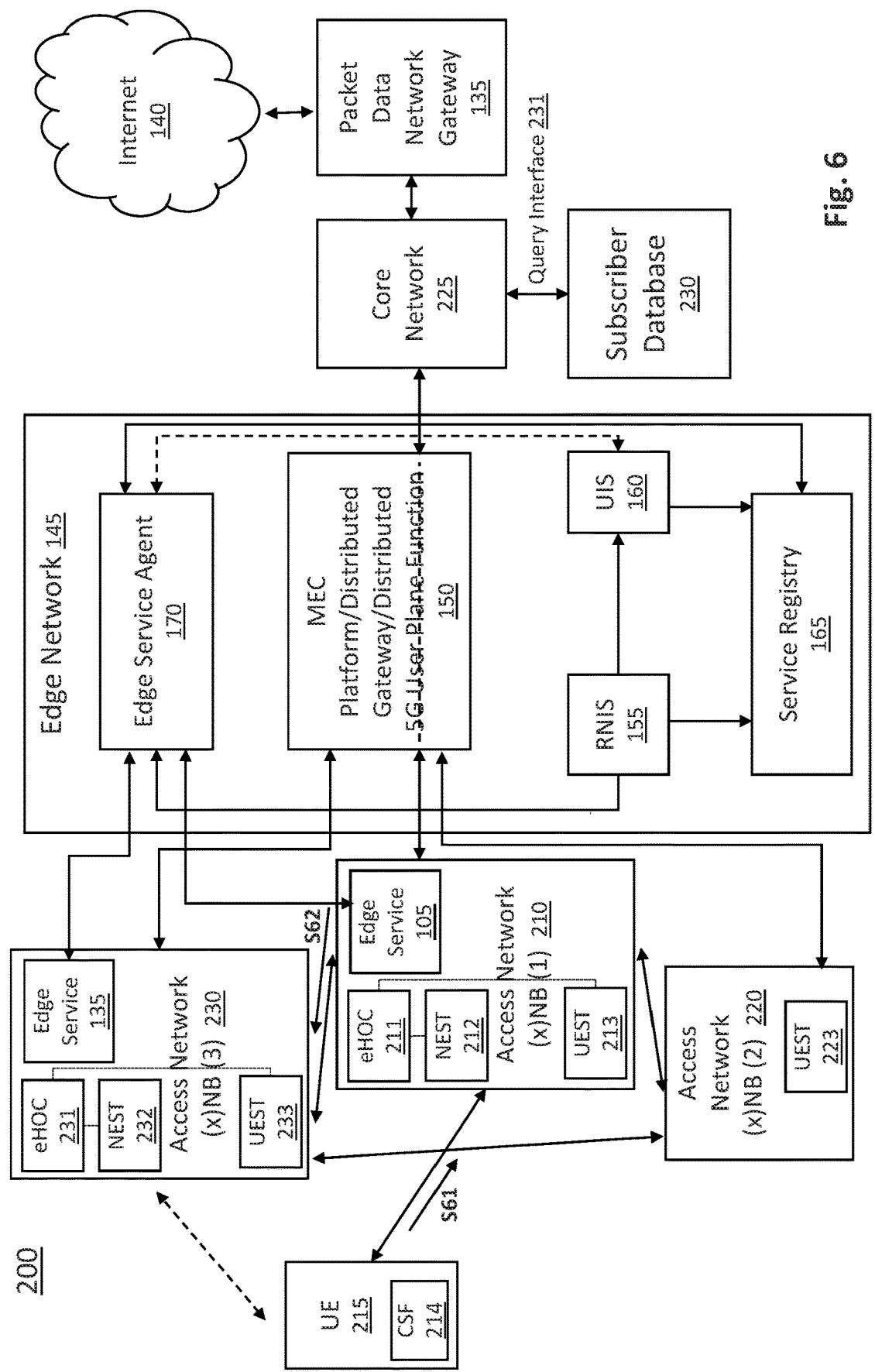
FIG. 6 illustrates a handover decision based on edge service support according to some embodiments using the first example implementation.

Now reference is made to FIG. 6 illustrating a scenario 4 according to some embodiments, in which access element 210 makes a handover decision based on available edge services at neighbor and usage by the UE/device 215. The wireless communication system 200 of FIG. 6 comprises the access element 230 described with respect to FIG. 5.

Following steps are performed to ensure that edge services are continually available to UE/device 215 even after handover.

In a first step, the UE/device 215 reports the radio measurements in measurement report as defined in respective 3GPP standards, which is depicted by S61 in FIG. 6. Enhanced handover control (eHOC) 211 of the access element 210 receives this message.

In a second step, eHOC 211 makes a list of candidate cells based on measurements from the UE/device 215 and the threshold set at access element 210.

In a third step, from these candidate cells, the access element 210 checks for availability of edge services from neighboring cells stored in its NEST 212 to match the edge service currently being used by the UE/device 215 or edge services authorized for the UE/device 215 as stored in UEST 213 according to above-described scenario 1.

In a fourth step, based on best match of edge services availability and radio measurement, the access element 210 selects the target cell and starts the handover procedure.

In a fifth step, when sending the X2/Xn handover preparation message (which is indicated by S62 in FIG. 6) to the destination e/gNodeB (access element 230) the message is extended to contain the list of authorized edge services for the UE/device 215. On accepting the handover this list of authorized services is stored in the UEST 233 of the target e/gNodeB (access element 230) and is removed from source e/gNodeB (access element 210) upon receipt of UE context release after successful handover.

It is to be noted that details of handover procedural changes are not within the scope of the present application but are covered by the application PCT/EP2017/073691.

With the first example implementation, according to some embodiments, the UE/device 215 can select a cell that supports the edge service the UE/device 215 is subscribing to or authorized for.

Further, according to some embodiments, enhanced handover control 211 can select a target cell which can best support the edge services being used by the UE/device 215.

Further, according to some embodiments, the method is based on extending the 3GPP procedures in a way which is backward compatible and can be easily adopted by UE/device vendors, network equipment vendors and operators without impacting legacy systems. For example, a UE/device not supporting eSIB, enhanced attach response or the new NAS message (for notifying UE of changes to either authorized edge services or to subscribed edge services) can just ignore these extensions and work without any issues.

Similarly, an eNodeB not supporting enhanced X2 setup request and eNodeB configuration update messages is able to ignore the extensions without any side effects.

Further, according to some embodiments, operation is enabled for devices that depend on edge services for latency, throughput reasons, quality of experience and for effectively operating like in case of IoT (Internet of things) and vehicles.

Further, according to some embodiments, 3GPP based implementation is best suited for scenarios where the user's/device's subscription itself contains information about edge services required for it.

Further, according to some embodiments, the edge service criterion is used at the time of initial cell selection or handover itself rather than after inspecting active traffic relevant for such services. This way, whenever a UE/device needs to utilize these services, they are readily available instead of incurring control plane signaling latency at that time to move the UE/device to such a cell.

Figure 7:
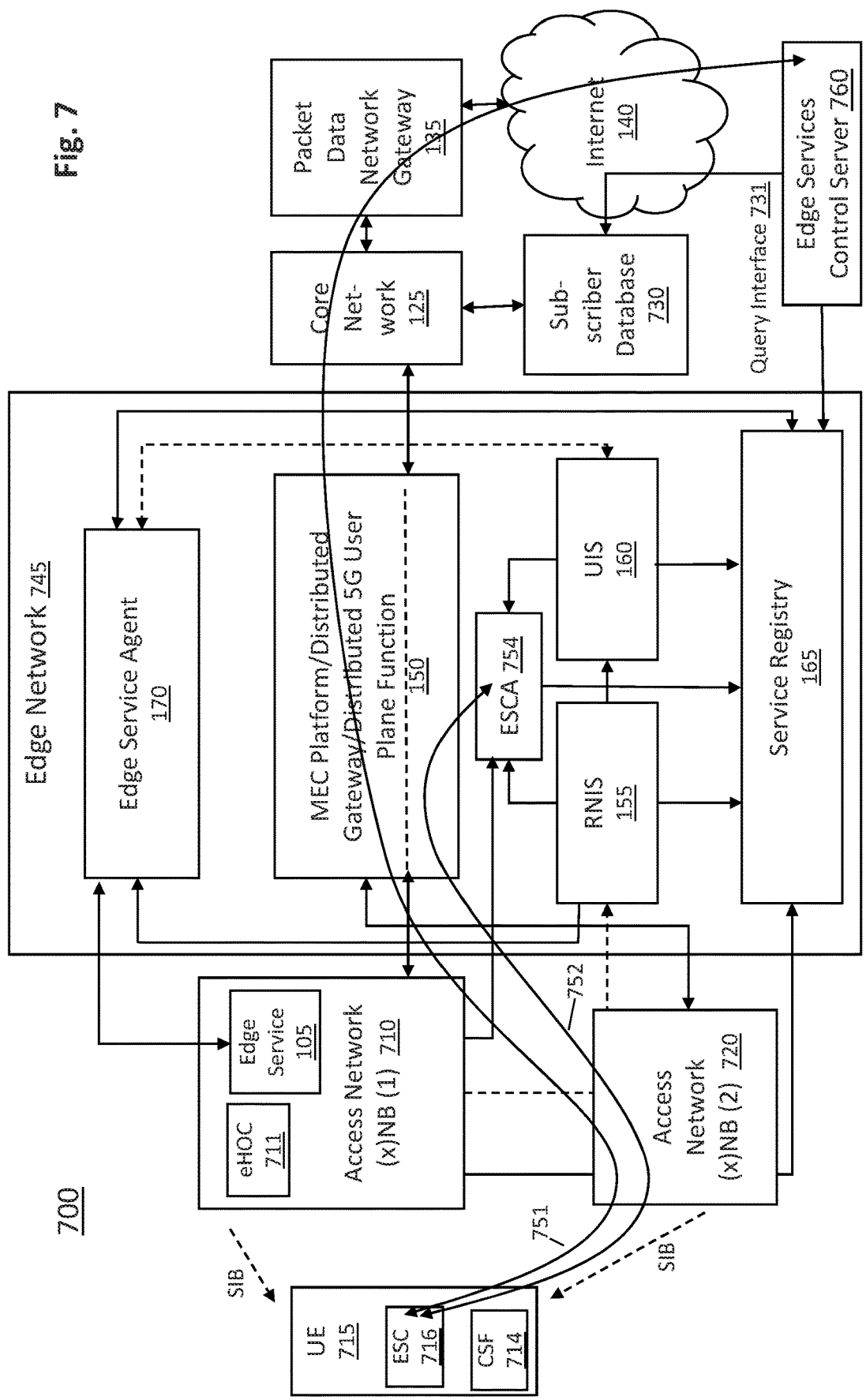
FIG. 7 shows a schematic block diagram illustrating a second example implementation of a wireless communication system according to some embodiments.

Now reference is made to FIG. 7 which shows a schematic block diagram illustrating a second example implementation of a wireless communication system 700 according to some embodiments.

The second example implementation is based on over the top (OTT) signaling, using at some places application level (HTTP(s)) signaling instead of 3GPP procedures. According to some embodiments, OTT refers to the fact that application level (HTTP(s)) signaling messages are carried on top of LTE EPS bearer, but is not limited thereto. OTT can be carried over any other suitable bearer in case of 5G and other access technologies.

In the wireless communication system 700, structure and functionality of edge service 105, elements 150, 155, 160, 165 and 170 of edge network, core network 125, packet data network gateway 135 and the Internet 140 are similar to structure and functionality of the corresponding elements described with respect to the wireless communication system 100 shown in FIG. 1.

According to some embodiments, the wireless communication system 700 shown in FIG. 7 comprises a radio access node (which is also referred to as access element) 710, e.g. an e/gNodeB, that is responsible for hosting and providing edge services (comprising the edge service 105) that require layer 2 and/or layer 1 (e.g. radio insights) as described with respect to access node 110 of FIG. 1. According to some embodiments, access element 210 comprises the functionality of access node 110.

According to some embodiments, the access element 710 registers supported edge services per cell with the service registry 165 at the edge network 745 as described above with respect to FIG. 1. According to some alternative embodiments, the service registry 165 is hosted at the core network 125.

While deciding about handover to target cell for a UE/device 715, enhanced handover control (eHOC) 711 of the access element 710 also takes into consideration a list of edge services the UE/device 715 is utilizing or the UE/device 715 is authorized to access and also availability of these edge services at candidate target cells in addition to UE reported radio measurements.

In other words, referring to FIG. 7 and to FIG. 11 illustrating process 1, in addition to steps S1110, S1120 and S1130 described above, according to some embodiments, in step S1140, the access element 710 decides on a handover of the UE/device 715 to another (second) access element of access elements, based on edge service information on edge services which are provided by the access elements, authorized service information on authorized edge services for the UE/device 715, and radio measurements provided by the UE/device 715. The edge services provided by the access elements are registered with the service registry 165 implemented externally to the access elements, e.g. in the edge network 745 or in the core network 125. The access element 710 may obtain the authorized service information from the edge services coordination agent 754 using hypertext transfer protocol signaling, and may obtain the edge service information from the service registry 165.

Access element 720 shown in FIG. 7 may provide access to the edge network 745, but does not comprise functionality of edge service and eHOC.

According to some embodiments, the wireless communication system 700 shown in FIG. 7 comprises the UE/device 715 that is enhanced to learn about its subscribed edge services using an OTT mechanism by a component called edge services client (ESC) 716. The same OTT mechanism also informs the UE/device 715 about the availability of edge services at various cells. The UE/device 715 comprises a cell selection function (CSF) 714 that is enhanced to compare availability of edge services at a cell and a received power level from the cell. ESC 714 also has a default value of offset for radio measurements to relax cell selection criteria. This value can be updated e.g. by querying an operator specific value from ESCS 760 via communication path 751 in case the UE/device 715 attaches to the edge network 745 over access element 720. Cell selection is made to the cell best offering the required edge services and radio conditions.

It is to be noted that ESC 716 in the client can either be realized as an application on UE/device 715 or can be integrated in an operating system of the UE/device 715.

In other words, referring to FIG. 14 illustrating process 4, according to some embodiments, in step S1410, the UE/device 715 obtains authorized service information on one or more edge services for which the user equipment is authorized, obtains, in step S1420, edge service information on edge services provided by access elements to provide access to wireless communication system 700, and, in step S1430, selects an access element (e.g. access element 710) based on the authorized service information, the edge service information and radio measurements performed by the UE/device 715. The UE/device 715 may obtain at least one of the service edge information and the authorized service information from edge services control server 760, by using edge services client 716 implemented in the UE/device 715, and may provide the authorized service information to an edge services coordination agent 754 of the edge network 745.

According to some embodiments, the wireless communication system 700 shown in FIG. 7 comprises the edge services control server (ESCS) 760 which is the OTT server to which the UE/device 715 comprising ESC 716 connects to query about subscribed services. The ESCS 760 can be located either centrally, e.g. in operator's network behind PGW 135, or at the edge network 745. The ESCS 760 uses interfaces (e.g. query interface 731) provided by subscriber database 730 to query about edge services subscribed by the UE/device 715 and delivers this information to the UE/device 715 e.g. via communication path 751. It also queries the service registry 165 to find the list of cells which support required services and provide this list of candidate cells to UE/device 715 (along with edge services supported) for cell selection operation. The ESCS 760 may be placed in an operator network or on an operator owned server.

In other words, referring to FIG. 15 illustrating process 5, according to some embodiments, in step S1510, the ESCS 760 provides authorized service information on one or more edge services for which the UE/device 715 is authorized to the UE/device 715 using hypertext transfer protocol signaling. Further, the ESCS 760 may provide to the UE/device 715, edge service information on edge services provided by access elements to provide access to the wireless communication system 700, using hypertext transfer protocol signaling.

According to some embodiments, the wireless communication system 700 shown in FIG. 7 comprises the edge services coordination Agent (ESCA) 754 at the edge network 745. The task of the ESCA 754 is to gather information about the authorized edge service for the UE/device 715 e.g. via communication path 752 in case the UE/device 715 attaches to the edge network 745 over access element 720, and store it internally. It relies on RNIS 155 to inform about admission and removal of UE/device 715 at the edge network 745. At the removal of UE/device 715 or bearer release or handover, this service again removes the entry for the UE/device 715. It provides HTTPS API based interface to query the authorized edge services for a UE/device 715 based on its temporary UE Id (e.g. S-TMSI, UE eNB S1AP ID+MME S1AP Id) or IP address or permanent UE Id (e.g. IMSI or any other equivalent UE identifier).

Figure 16:
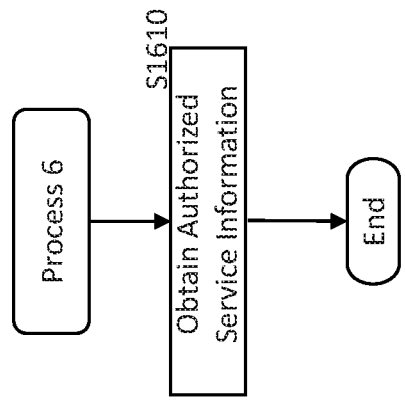
FIG. 16 shows a flow chart illustrating a process executable by an edge services control agent according to some embodiments of the invention.

In other words, referring to FIG. 16 illustrating a process 6, according to some embodiments, in step S1610, the ESCA 754 obtains, from the UE/device 715, authorized service information on one or more edge services for which the UE/device 715 is authorized.

According to some embodiments, the wireless communication system 700 shown in FIG. 7 comprises the subscriber database 730 which is similar to subscriber database 230 described with respect to FIG. 2, with a difference that the subscriber database 730 exposes RESTful secure interfaces towards OTT (ESCS) server 760 instead of core network 125.

In other words, referring to FIG. 17 illustrating process 7, according to some embodiments, in step S1710, the subscriber database 730 stores authorized service information on authorized edge services of UE/device 715, and, in step S1720, provides at least one interface 731 to query the authorized service information and to indicate changes of the authorized service information, wherein the at least one interface comprises interfaces to an edge services control server 760. The subscriber database 730 may provide mapping between edge service identifiers and edge service names.

In the following, scenario examples according to the second example implementation illustrated in FIG. 7 will be described referring to FIGS. 8 to 10.

Figure 8:
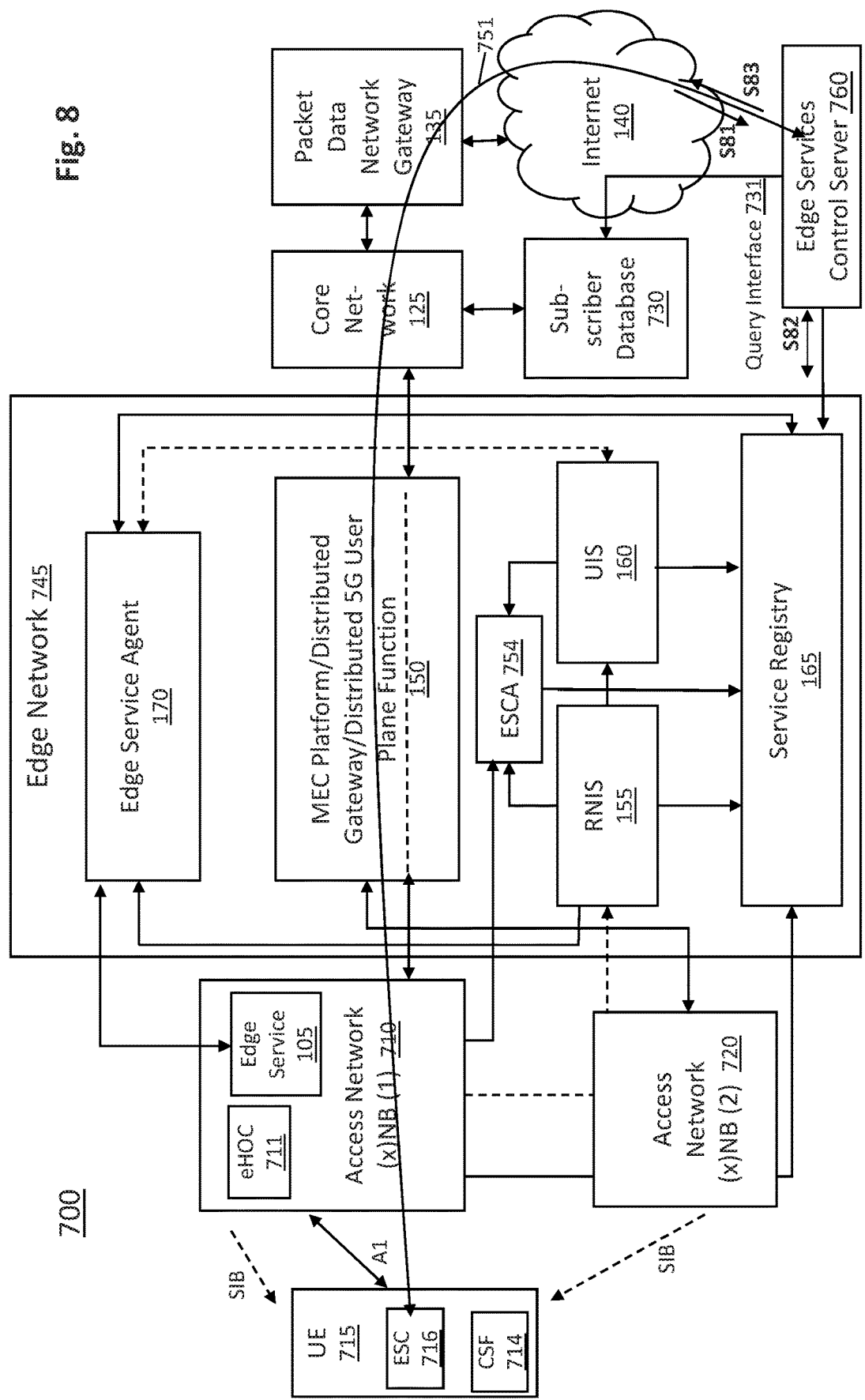
FIG. 8 illustrates discovery of cells with required edge services according to some embodiments using the second example implementation.

FIG. 8 illustrates a scenario 1 according to some embodiments, in which the UE/device 715 makes a cell selection decision based on information the UE/device 715 receives about edge service(s) it is authorized/subscribed to use.

In a first step, the UE/device 715 listens and decodes a SIB message (as defined in 3GPP) from a serving cell, which is access element 710 in the present example. The UE/device 715 measures a signal strength from neighboring cells (access element 720 in the present example) e.g. by relying on neighbors' reference signals, and prepares a list of all neighboring cells it can measure.

In a second step indicated by S81 in FIG. 8, the UE/device 715 sends the list of cell ids (physical cells ids) prepared in the first step in a HTTPS query message to ESCS 760 along with the physical cell id and E-CGI of its own serving cell (access element 710) via communication path 751.

In a third step indicated by S82 in FIG. 8, the ESCS makes a HTTPS based query to the relevant service registry/registries 165 about edge service(s) supported by cells id passed in previous queries.

It is to be noted that the ESCS 760 may need to contact configuration/SON database at operator network to convert the physical cell ids to ECGIs based on E-CGI of the serving cell sent in the query and to know the IP address(es) of service registry/ies to contact.

In a fourth step indicated by S83 in FIG. 8, the ESCS 760 responds to the UE/device 715 with the list of edge services each cell supports via communication path 751. Along with this list the ESCS 760 may also send an offset for radio measurements to relax the cell selection criteria.

In a fifth step indicated by A1 in FIG. 8, the UE/device 715 makes a cell (re-) selection based on the edge services required by UE/device 715 (it can get this information as described in scenario 2 described below by referring to FIG. 9), edge services supported by the cells and cells whose radio power levels are within the offset received in previous set.

Figure 9:
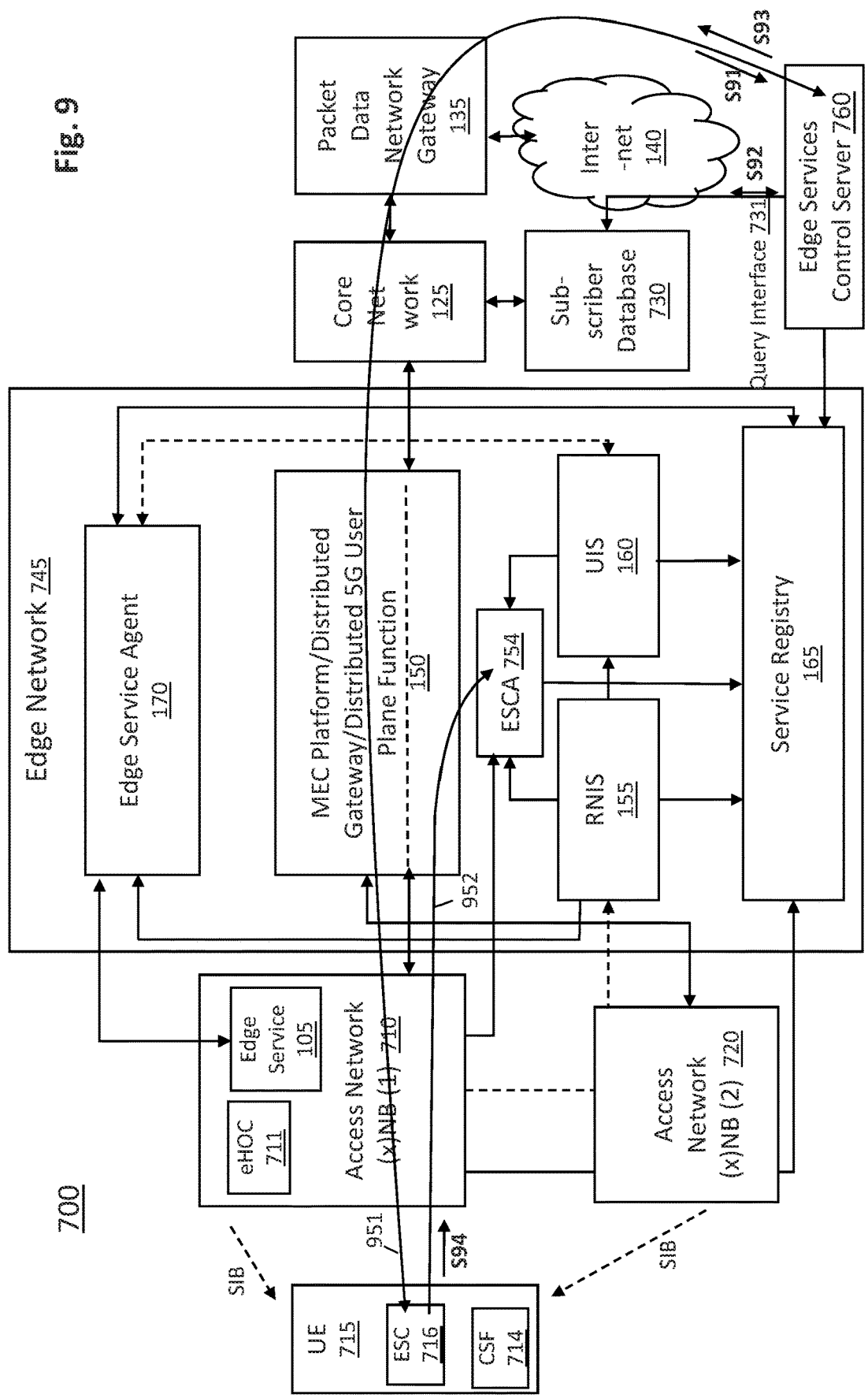
FIG. 9 illustrates discovery of UE's subscribed edge services according to some embodiments using the second example implementation.

Now reference is made to FIG. 9 illustrating a scenario 2 according to some embodiments, in which the UE/device 715 attaches to networks and discovers its subscribed edge services.

After making the initial cell selection and attach procedure as per 3GPP standards, in a first step indicated by S91 in FIG. 9, the ESC 716 in the UE/device 715 contacts the ESCS 760 by sending a HTTPS message to query about the edge services it has subscribed to via communication path 951. The ESC 716 can know the end-point address of ESCS 760 by performing a DNS query for it first. Alternatively, ESCS end-point address can be preconfigured in ESC 716. The ESC's query to ESCS 760 for subscribed edge services can be made based on subscriber's identity e.g. MSISDN.

In a second step indicated by S92 in FIG. 9, the ESCS 760 contacts the subscriber database 730 using HTTPS interface (e.g. query interface 731) to query for the edge services subscribed by the UE/device 715 and/or authorized for the UE/device 715 based on subscriber identity provided in S91.

In a third step indicated by S93 in FIG. 9, the ESCS 760 prepares a response and sends it in HTTPS POST to the UE/device 715 via communication path 951. The response may contain information on edge services (service ids and names) subscribed by the UE/device 715 and/or authorized for the UE/device 715.

The ESC 716 stores the received information about subscribed edge services in UE's/device's database e.g. in u/eSIM.

According to some embodiment, additionally, the ESCS 760 receives notifications from subscriber database 730 on a change in UE's subscription and informs the ESC 716 of the same in a HTTPS POST procedure. The ESC 716 stores the updates in UE's/device's database e.g. in u/eSIM.

In a fourth step indicated by S94 in FIG. 9, the ESC 716 connects to the ESCA 754 at the edge network 745 via communication path 952 and performs a HTTPS PUT/POST operation providing the UE's/device's identity (S-TMSI/IP address) and the edge services details it received in S93 to be stored with ESCA 754 at the edge network 745.

On receiving a release/handover outside current edge network notification from RNIS 155, the ESCA 754 removes this entry from its internal database.

It is to be noted that the UE/device 715 can be provided with ESCA end-point IP address either as part of response form ESCS in S93 or using an existing DNS query based mechanism.

According to some embodiments, another sub-flow of S94 happens in a scenario where the UE/device 715 is already aware of the edge services and is just moving form idle to connected state or handing over from one cell to another. In such case, S94 is initiated by UE/device 715 for each inter-NodeB handover (taking the UE/device 715 outside the e/gNodeBs covered by edge network 745) and idle to connected state transition.

Figure 10:
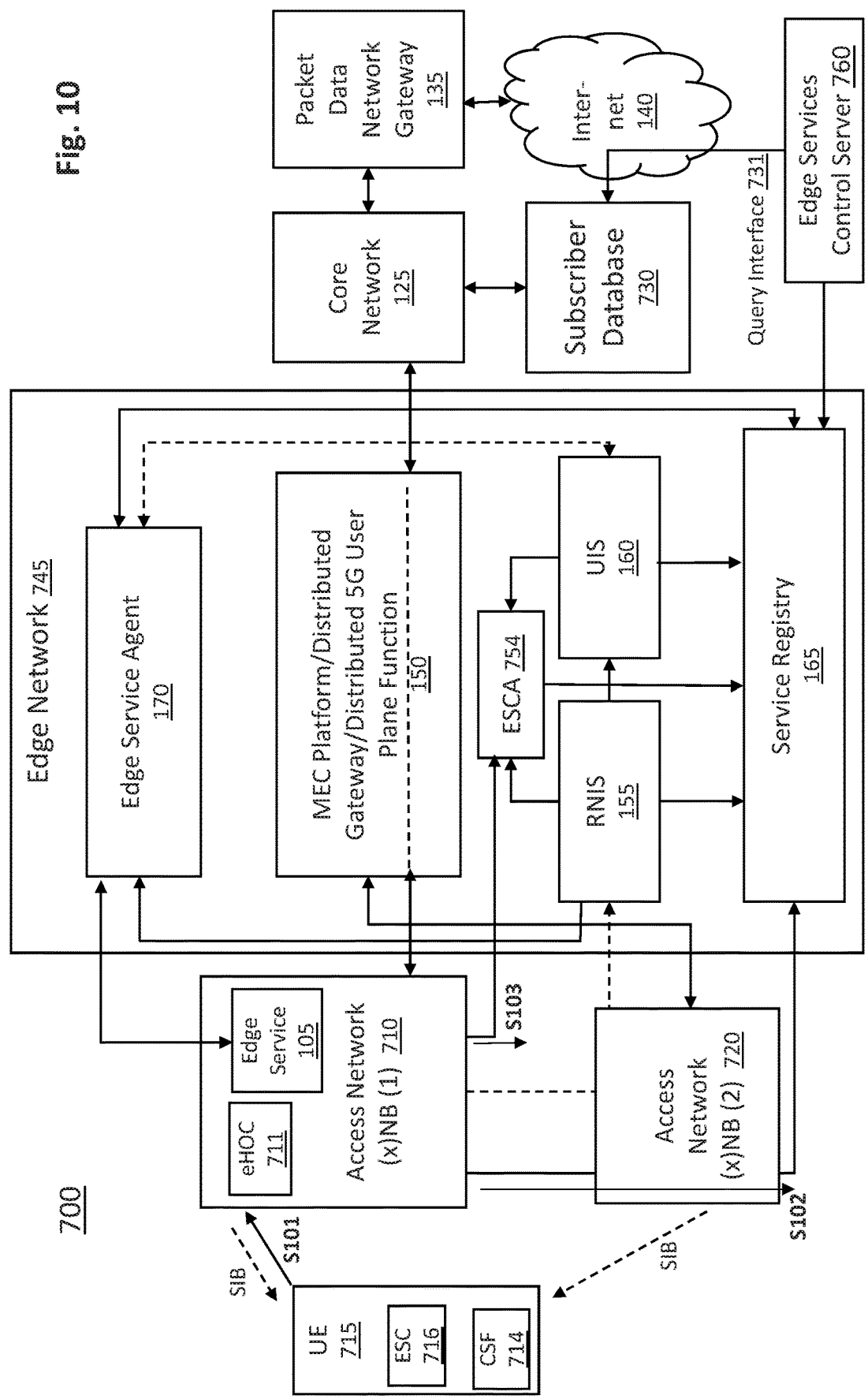
FIG. 10 illustrates a handover decision based on edge service support according to some embodiments using the second example implementation.

Now reference is made to FIG. 10 illustrating a scenario 3 according to some embodiments, in which the access the access element 710 makes a handover decision based on available edge services at neighboring cells and usage by the UE/device 715.

In a first step indicated by S101 in FIG. 10, the UE/device 715 sends RRC measurements report as per 3GPP standards to the access element 710.

In a second step, the eHOC 711 creates a list of candidate cells for handover purely based on measurement reports received in S101.

In a third step indicated by S102 in FIG. 10, the eHOC 711 sends an HTTPS GET query to the service registry 165 at the edge network 745 with the list of candidate cells determined in the second step to find the edge services supported at each of those cells.

It is to be noted that the information about the cells and the services they support is available in the service registry 165 as per the procedure described above with respect to FIG. 1.

In a fourth step indicated by S103 in FIG. 10, the eHOC 711 sends an HTTPS GET to query ESCA 754 at edge network 745 to get the list of authorized services for the UE/device 715 providing it the identity of the UE/device 715 (as used in scenario 2 illustrated in FIG. 9, like S-TMSI or other suitable identity like eNB S1AP Id) with which the entries are made.

In a fifth step, based on the edge services supported by candidate cells, UE/device reported radio measurement and edge services required by the UE/device 715, the eHOC 711 chooses the most appropriate cell for handover.

In a sixth step, the eHOC 711 initiates the process of handover. It is to be noted that details of handover procedural changes are not within the scope of the present application but are covered by the application PCT/EP2017/073691.

With this second example implementation, according to some embodiments, the UE/device 715 can select the cell which best supports the edge service the UE/device 715 is subscribing to or authorized for.

Further, according to some embodiments, handover control 711 can select a target cell which can best support the edge services being used by the UE/device 715.

Further, according to some embodiments, an OTT mechanism is adopted between client and server to exchange information about edge services subscription of the UE/device 715. This mechanism can be separately standardized and does not impact 3GPP interfaces.

Further, according to some embodiments, capabilities in terms of edge services support is kept in each cell at the edge network/cloud and is queried from it by neighboring cells without impacting X2/Xn interfaces. The interface between edge network/cloud and eHOC 711 at access element 710 can be subject of standardization for RAN-MEC interface at ETSI MEC/3GPP.

Further, according to some embodiments, operation for devices is enabled which depend on edge services for latency and throughput reasons for effectively operating like in case of IoT and vehicles.

Further, according to some embodiments, OTT mechanism is best suited where application layer decides on the edge services required for a scenario. In this case the application (App at UE) can request ESC at UE to trigger the procedure as defined in scenario 1 above to get the edge services as and when required.

Further, according to some embodiments, services like ESCS, ESCA and Service Registry can be implemented that offer secure API based access. These APIs can be opened for authorized usage by eNodeB, applications at UE or other third-party applications.

Further, according to some embodiments, the edge service criterion is used at the time of initial cell selection or handover itself rather than after inspecting active traffic relevant for such services. This way, whenever the UE/device 715 needs to utilize these services, they are readily available instead of incurring control plane signaling latency at that time to move the UE/device 715 to such a cell.

It is to be noted that although the first and second example implementations are provided separately it is possible to implement a mix-and-match of the them. For example, discovering cell edge services for a UE/device can be done using the second example implementation, but cell selection can be done using eSIB of the first example implementation.

In general, the various embodiments of the UE/device 215, 715, the access element 210, 710, the (element of the) core network 225, the subscriber database 230, 730, the ESCA 754 and the ESCS 760 may be implemented in hardware or special purpose circuits, software (computer readable instructions embodied on a non-transitory computer readable medium), logic or any combination thereof. For example, some aspects may be implemented in hardware, while other aspects may be implemented in firmware or software which may be executed by a controller, microprocessor or other computing device, although the invention is not limited thereto.

Figure 18:
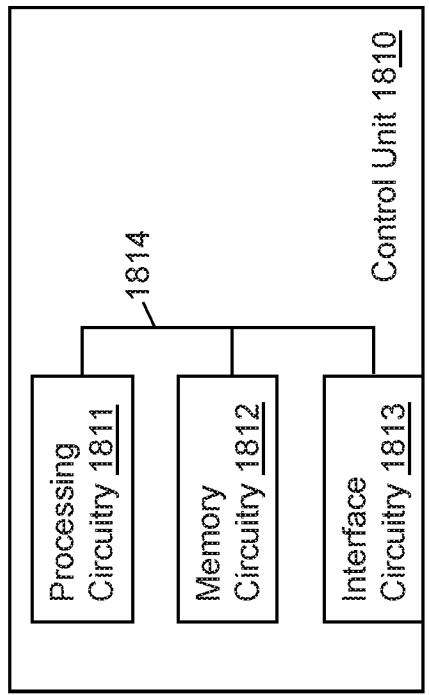
FIG. 18 shows a schematic block diagram illustrating a configuration of a control unit in which some examples of embodiments of the invention are implementable.

Referring to FIG. 18, according to some embodiments, each of the UE/device 215, 715, the access element 210, 710, the (element of the) core network 225, the subscriber database 230, 730, the ESCA 754 and the ESCS 760 has and/or uses a control unit 1810 which comprises processing circuitry 1811, memory circuitry 1812 and interface circuitry 1813 coupled via a link 1814.

Further, as used in this application, the term "circuitry" refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to some embodiments, a first access element of a first aspect is provided, which provides access to a wireless communication system. The first access element may execute process 1 shown in FIG. 11 and may include and/or use circuitry similar to that of the control unit 1810 shown in FIG. 18. The first access element of the first aspect comprises:

means for activating one or more edge services in response to receiving information identifying at least one of a user, a radio access bearer and a flow that is to be served by the one or more edge services;

means for generating, at the one or more edge services, a service result based on at least one of a layer 1 parameter and a layer 2 parameter available at the first access element;

means for transmitting the service result to an edge service agent implemented externally to the first access element; and means for deciding on a handover of a user equipment from the first access element to a second access element of second access elements, based on second edge service information on edge services which are provided by the second access elements, authorized service information on authorized edge services for the user equipment, and radio measurements provided by the user equipment.

According to some embodiments, a first access element of a second aspect is provided, which provides access to a wireless communication system. The first access element may execute process 2 shown in FIG. 12 and may include and/or use circuitry similar to that of the control unit 1810 shown in FIG. 18. The first access element of the second aspect comprises:

means for broadcasting first edge service information about one or more edge services provided by the first access element;

means for activating the one or more edge services in response to receiving information identifying at least one of a user, a radio access bearer and a flow that is to be served by the one or more edge services;

means for generating, at the one or more edge services, a service result based on at least one of a layer 1 parameter and a layer 2 parameter available at the first access element; and means for transmitting the service result to an edge service agent implemented externally to the first access element.

According to some embodiments, the first access element of the first aspect comprises means for broadcasting first edge service information about the one or more edge services provided by the first access element.

According to some embodiments, the means for broadcasting of the first access element of the first and second aspects broadcast the first edge service information for each cell served by the first access element, and/or broadcast the first edge service information in a data format which comprises at least one of a cell identifier, a list of edge services identified by their respective edge service identifiers, and an offset value to relax cell selection power level criteria.

According to some embodiments, a first access element of a third aspect is provided, which provides access to a wireless communication system. The first access element may execute process 3 shown in FIG. 13 and may include and/or use circuitry similar to that of the control unit 1810 shown in FIG. 18. The first access element of the third aspect comprises:

means for activating one or more edge services in response to receiving information identifying at least one of a user, a radio access bearer and a flow that is to be served by the one or more edge services;

means for generating, at the one or more edge services, a service result based on at least one of a layer 1 parameter and a layer 2 parameter available at the first access element;

means for transmitting the service result to an edge service agent implemented externally to the first access element;

means for receiving, from second access elements, second edge service information on edge services which are provided by the second access elements; and means for storing the second edge service information in a neighbor edge services database.

According to some embodiments, the first access element of the first and second aspects comprises:

means for receiving the second edge service information from the second access elements; and means for storing the second edge service information in a neighbor edge services database.

According to some embodiments, the first access element of the first to third aspects comprises:

means for transmitting first edge service information on the one or more edge services provided by the first access element to the second access elements.

According to some embodiments, the first access element of the first to third aspects comprises:

means for obtaining, from an element of a core network of the wireless communication system, the authorized service information on the authorized edge services for the user equipment; and means for storing the authorized service information in a user equipment edge services database.

According to some embodiments, the first access element of the first to third aspects comprises:

means for providing the authorized service information stored in the user equipment edge services database to the second access element in response to the user equipment being handed off from the first access element to the second access element.

According to some embodiments, the first access element of the first to third aspects comprises:

means for registering one or more edge services provided by the first access element and the second access elements with a service registry implemented externally to the first and second access elements;

means for obtaining the authorized service information from an edge services coordination agent using hypertext transfer protocol signaling; and means for obtaining the second edge service information from the service registry.

According to some embodiments, a user equipment of a fourth aspect is provided, which may execute process 4 shown in FIG. 14 and may include and/or use circuitry similar to that of the control unit 1810 shown in FIG. 18. The user equipment comprises:

means for obtaining authorized service information on one or more edge services for which the user equipment is authorized;

means for obtaining edge service information on edge services provided by access elements to provide access to a wireless communication system; and means for selecting an access element of the access elements based on the authorized service information, the edge service information and radio measurements performed by the user equipment, wherein the one or more edge services generate a service result based on at least one of a layer 1 parameter and a layer 2 parameter available at the access element.

According to some embodiments, the means for obtaining the service edge information obtain the service edge information from the access elements via broadcast messages, and/or the means for obtaining the authorized service information obtain the authorized service information from an element of a core network of the wireless communication system.

According to some embodiments, the means for obtaining obtain at least one of the service edge information and the authorized service information from an edge services control server, by using an edge services client implemented in the user equipment, the user equipment further comprising:

means for providing the authorized service information to an edge services coordination agent implemented externally to the access element.

According to some embodiments, an apparatus of a fifth aspect is provided, which may execute process 5 shown in FIG. 15 and may include and/or use circuitry similar to that of the control unit 1810 shown in FIG. 18. The apparatus comprises:

means for providing authorized service information on one or more edge services for which a user equipment is authorized to the user equipment, wherein the one or more edge services generate a service result based on at least one of a layer 1 parameter and a layer 2 parameter available at an access element providing access to a wireless communication system for the user equipment.

According to some embodiments, the means for providing:

provide the authorized service information to the user equipment by an element of a core network of the wireless communication system during an attach procedure or using downlink non-access stratum transport; and/or provide the authorized service information to the access element by an element of the core network during an initial context setup.

According to some embodiments, the means for providing provide the authorized service information to the user equipment by an edge services control server using hypertext transfer protocol signaling.

According to some embodiments, the means for providing provide, by the edge services control server to the user equipment, edge service information on edge services provided by access elements to provide access to the wireless communication system, using hypertext transfer protocol signaling.

According to some embodiments, an edge services coordination agent of a sixth aspect is provided, which may execute process 6 shown in FIG. 16 and may include and/or use circuitry similar to that of the control unit 1810 shown in FIG. 18. The edge services coordination agent comprises:

means for obtaining, from a user equipment, authorized service information on one or more edge services for which the user equipment is authorized, wherein the one or more edge services generate a service result based on at least one of a layer 1 parameter and a layer 2 parameter available at an access element providing access to a wireless communication system for the user equipment.

According to some embodiments, a subscriber database of a seventh aspect is provided, which may execute process 7 shown in FIG. 17 and may include and/or use circuitry similar to that of the control unit 1810 shown in FIG. 18. The subscriber database of a wireless communication system comprises:

means for storing authorized service information on authorized edge services of a user equipment, wherein the edge services generate a service result based on at least one of a layer 1 parameter and a layer 2 parameter available at an access element providing access to the wireless communication system for the user equipment; and means for providing at least one interface to query the authorized service information and to indicate changes of the authorized service information, wherein the at least one interface comprises interfaces to a core network or to an edge services control server.

According to some embodiments, the subscriber database comprises means for providing mapping between edge service identifiers and edge service names.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method for use by a first access element configured to provide access to a wireless communication system, the method comprising:

activating at least one edge service in response to receiving information identifying at least one of a user, a radio access bearer, and a flow that is to be served by the at least one edge service;

generating, at the at least one edge service, a service result based on at least one of a layer 1 parameter and a layer 2 parameter available at the first access element;

transmitting the service result to an edge service agent implemented externally to the first access element; and performing a handover of a user equipment from the first access element to a second access element of a plurality of second access elements, based on second edge service information on edge services provided by the plurality of second access elements, authorized service information on authorized edge services for the user equipment, and radio measurements provided by the user equipment.

2. The method of claim 1, comprising:

broadcasting first edge service information associate with the at least one edge service provided by the first access element.

3. The method of claim 2, comprising:

receiving the second edge service information from the plurality of second access elements; and storing the second edge service information in a neighbor edge services database.

4. The method of claim 3, comprising:

transmitting the first edge service information on the at least one edge service provided by the first access element to the plurality of second access elements.

5. The method of claim 1, comprising:
obtaining, from an element of a core network of the wireless communication system, the authorized service information on the authorized edge services for the user equipment; and
storing the authorized service information in a user equipment edge services database.

6. The method of claim 5, comprising:
providing the authorized service information stored in the user equipment edge services database to the second access element in response to the user equipment being handed off from the first access element to the second access element.

7. The method of claim 1, comprising at least one of:
registering at least one edge service provided by the first access element and the plurality of second access elements with a service registry implemented externally to the first and second access elements;
obtaining the authorized service information from an edge services coordination agent using hypertext transfer protocol signaling; and
obtaining the second edge service information from the service registry.

8. A non-transitory computer-readable storage medium storing a program for a computer, comprising software code portions for performing the following, when the program is run on the computer:
activating at least one edge service in response to receiving information identifying at least one of a user, a radio access bearer, and a flow that is to be served by the at least one edge service;
generating, at the at least one edge service, a service result based on at least one of a layer 1 parameter and a layer 2 parameter available at a first access element;
transmitting the service result to an edge service agent implemented externally to the first access element; and
performing a handover of a user equipment from the first access element to a second access element of a plurality of second access elements, based on second edge service information on edge services that are provided by the plurality of second access elements, authorized service information on authorized edge services for the user equipment, and radio measurements provided by the user equipment.

9. A first access element to provide access to a wireless communication system, the first access element comprising at least one processor and at least one memory including computer program code, the at least one memory and the computer program code configured to, with the at least one processor, cause the first access element at least to perform:
activating at least one edge service in response to receiving information identifying at least one of a user, a radio access bearer, and a flow that is to be served by the at least one edge service;
generating, at the at least one edge service, a service result based on at least one of a layer 1 parameter and a layer 2 parameter available at the first access element;
transmitting the service result to an edge service agent implemented externally to the first access element; and
performing a handover of a user equipment from the first access element to a second access element of a plurality of second access elements, based on second edge service information on edge services that are provided by the plurality of second access elements, authorized service information on authorized edge services for the user equipment, and radio measurements provided by the user equipment.

10. The first access element of claim 9, wherein the at least one memory and the computer program code are configured to, with the at least one processor, cause the first access element to further perform:
broadcasting first edge service information associated with the at least one edge service provided by the first access element.

11. The first access element of claim 10, wherein the at least one memory and the computer program code are configured to, with the at least one processor, cause the first access element to further perform:
receiving the second edge service information from the plurality of second access elements; and
storing the second edge service information in a neighbor edge services database.

12. The first access element of claim 11, wherein the at least one memory and the computer program code are configured to, with the at least one processor, cause the first access element to further perform:
transmitting the first edge service information on the at least one edge service provided by the first access element to the plurality of second access elements.

13. The first access element of claim 9, wherein the at least one memory and the computer program code are configured to, with the at least one processor, cause the first access element to further perform:
obtaining, from an element of a core network of the wireless communication system, the authorized service information on the authorized edge services for the user equipment; and
storing the authorized service information in a user equipment edge services database.

14. The first access element of claim 13, wherein the at least one memory and the computer program code are configured to, with the at least one processor, cause the first access element to further perform:
providing the authorized service information stored in the user equipment edge services database to the second access element in response to the user equipment being handed off from the first access element to the second access element.

15. The first access element of claim 9, wherein the at least one memory and the computer program code are configured to, with the at least one processor, cause the first access element to further perform at least one of the following:
registering at least one edge service provided by the first access element and the plurality of second access elements with a service registry implemented externally to the first and second access elements;
obtaining the authorized service information from an edge services coordination agent using hypertext transfer protocol signaling; and
obtaining the second edge service information from the service registry.

* * * * *